US010353106B2

(12) United States Patent
Mangione

(10) Patent No.: US 10,353,106 B2
(45) Date of Patent: *Jul. 16, 2019

(54) APPARATUS, METHOD AND SYSTEM FOR MAPPING FRACTURE FEATURES IN HYDRAULICALLY FRACTURED STRATA USING FUNCTIONAL PROPPANT PROPERTIES

(71) Applicant: Micah Thomas Mangione, Mesa, AZ (US)

(72) Inventor: Micah Thomas Mangione, Mesa, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/992,926

(22) Filed: Jan. 11, 2016

(65) Prior Publication Data
US 2016/0320518 A1 Nov. 3, 2016

Related U.S. Application Data

(63) Continuation of application No. 13/672,403, filed on Nov. 8, 2012, now Pat. No. 9,261,620.
(Continued)

(51) Int. Cl.
G01V 3/30 (2006.01)
G01S 13/88 (2006.01)
G01V 3/12 (2006.01)

(52) U.S. Cl.
CPC .............. *G01V 3/30* (2013.01); *G01S 13/885* (2013.01); *G01V 3/12* (2013.01)

(58) Field of Classification Search
CPC ... G01V 3/30; G01V 3/28; G01V 3/10; G01V 3/18; E21B 47/122; E21B 47/16; G01S 13/885; G01S 7/003
(Continued)

(56) References Cited

U.S. PATENT DOCUMENTS 5,720,354 A * 2/1998 Stump .................... E21B 7/046
175/26
6,261,247 B1 7/2001 Ishikawa et al.
(Continued)

FOREIGN PATENT DOCUMENTS

WO WO2010/057677 5/2010

OTHER PUBLICATIONS

USPTO; Non-Final Office Action dated Mar. 12, 2015 in U.S. Appl. No. 13/672,403.
(Continued)

Primary Examiner — Muhammad N Edun
Assistant Examiner — Jerold B Murphy
(74) Attorney, Agent, or Firm — Snell & Wilmer L.L.P.

(57) ABSTRACT

System and method for deploying multiple antennas in an array configuration with unobstructed electromagnetic access to a formation outside of a casing, sequencing the transmitted signal to control the direction of transmission into the formation, receiving the reflected signals, and locating the position of the reflection based on the scanned transmission signal orientation and the direction of the received signal. Such a deployment of an antenna array with unobstructed electromagnetic access to the formation outside of the casing, sequencing of the interrogation signal, and analysis of the received signal relative to the transmitted signal direction form the basis for reflection image rendering as the transmitted signal is scanned by a sequenced stimulus signal.

22 Claims, 23 Drawing Sheets

Related U.S. Application Data

(60) Provisional application No. 61/557,774, filed on Nov. 9, 2011.

(58) Field of Classification Search
USPC .............. 367/25–35, 81–85, 86; 175/40–50; 340/853.1–856.4
See application file for complete search history.

(56) References Cited

U.S. PATENT DOCUMENTS

| | | | |
|---|---|---|---|
| 6,714,153 B1 * | 3/2004 | Kong ..................... | G01V 3/30 324/323 |
| 7,059,428 B2 | 6/2006 | Frey et al. | |
| 7,598,898 B1 * | 10/2009 | Funk ..................... | G01S 7/003 342/175 |
| 9,261,620 B2 * | 2/2016 | Mangione ................ | G01V 3/12 |
| 2009/0277630 A1 * | 11/2009 | McDaniel ............... | E21B 43/26 166/250.1 |
| 2010/0066560 A1 * | 3/2010 | McDaniel ............ | E21B 43/267 340/854.9 |
| 2011/0251794 A1 * | 10/2011 | Bittar ..................... | G01V 3/30 702/11 |
| 2013/0154846 A1 | 6/2013 | Mangione | |

OTHER PUBLICATIONS

USPTO; Final Office Action dated Sep. 23, 2015 in U.S. Appl. No. 13/672,403.

USPTO; Notice of Allowance dated Oct. 22, 2015 in U.S. Appl. No. 13/672,403.

\* cited by examiner though a metal cased wellbore, receipt of the signals, and methods for analyzing the received signals to form a representative image of the proppant filled fracture.

APPARATUS, METHOD AND SYSTEM FOR MAPPING FRACTURE FEATURES IN HYDRAULICALLY FRACTURED STRATA USING FUNCTIONAL PROPPANT PROPERTIES

CROSS REFERENCE TO RELATED APPLICATIONS

This application is a continuation of U.S. application Ser. No. 13/672,403, entitled "APPARATUS, METHOD AND SYSTEM FOR MAPPING FRACTURE FEATURES IN HYDRAULICALLY FRACTURED STRATA USING FUNCTIONAL PROPPANT PROPERTIES," filed on Nov. 18, 2012, which claims priority to U.S. Provisional Patent Application No. 61/557,774 entitled "APPARATUS, METHOD AND SYSTEM FOR MAPPING FRACTURE FEATURES IN HYDRAULICALLY FRACTURED STRATA USING FUNCTIONAL PROPPANT PROPERTIES," filed on Nov. 9, 2011. The disclosures of which are incorporated herein by reference.

FIELD OF THE INVENTION

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped or flowed from the well. Oil and gas recovery is normally practiced in wellbores which have been cased in steel pipe surrounded by a cementitious fill to seal the wellbore. The artisan will appreciate that the term "casing" is colloquially used to describe a collection of pipe segments that extends from a target depth to the surface of the well; however, in this invention, the term "casing" will be used to describe a pipe segment and the term "casing string" to refer to a collection of pipe segments, which may or may not extend to the surface without any implication of limitation. In many cases the permeability of the formation holding the oil or gas is insufficient for economic recovery of oil and gas. In other cases, during operation of the well, the productivity of the formation drops to the extent that further recovery becomes uneconomical. In such cases, it is necessary to hydraulically fracture the formation and prop the fracture in an open condition by means of a proppant material or propping agent. Such fracturing is usually accomplished by hydraulic pressure through perforations in the steel casing, and the proppant material or propping agent is a particulate material, such as sand, resin coated sand or ceramic particles (all of which can be referred to as "proppant"), which are carried into the fracture by means of a fracturing fluid, sometimes containing high molecular weight polymers, such as guar gum, guar gum derivatives such as hydroxypropyl guar (HPG), carboxymethyl HPG (CMHPG), cellulose, cellulose derivatives such as hydroxyethyl cellulose (HEC), biopolymers, such as xanthan gum and polyvinyl alcohol, which increase the viscosity of the fracturing fluid.

A systematic method of characterizing the location of proppant as placed in a hydraulic fracture at distances from the cased wellbore exceeding more than several inches is currently unavailable. A primary limitation is a method for rendering images of a fracture field based on transmitted and reflected radar signals. A second limitation is the lack of controlled projection of interrogation signals into the formation from antenna assemblies deployed through a metal cased wellbore, receipt of the signals, and methods for analyzing the received signals to form a representative image of the proppant filled fracture.

Ground penetrating radar ("GPR") systems have been used in uncased wells to characterize objects and features in geologic formations such as natural fractures and salt-domes. Such commercially-available GPR systems are designed to work in uncased wells, and use large discrete antennas.

Existing systems have not been entirely satisfactory in all respects. Thus, there remains a need for improved systems and methods for characterizing objects and features in geologic formations.

SUMMARY OF THE INVENTION

The system and component technologies described herein enable a system and method capable of imaging proppant and/or fractures in hydraulically fractured strata in hydrocarbon bearing strata adjacent to cased wellbores.

One aspect of the present invention relies on the ability to scan a controlled and confined electromagnetic beam through a range of interrogation angles. Physical scanning of an electromagnetic beam can be accomplished with a rotating dish antenna; but, this approach is not practically useful in a metal cased borehole. A second method relies on arrays of antennas stimulated with sequenced signals. An antenna array is a group of two or more antennas which are interconnected in such a way that they can be operated or actuated in sequence, share a common time or frequency base, and whose received signals can be analyzed either individually or as part of a collection of signals corresponding to the electromagnetic properties resulting from the geometric layout of the two or more antennas. Such arrays can utilize a large variety of electronic excitation techniques that are similar to those currently practiced by air borne radar systems, which are of interest to the present invention such as: array pattern synthesis; beam forming; beam steering; and others which will become apparent to the person of skill in the art through the application of the present invention. Individual antennas are referred to as "antenna elements" and are connected through a matching network to a feed-point, which provides an optimized impedance match between the transmission line feed and the antenna elements across the preferred frequency range and which has an optimized voltage standing-wave ratio ("VSWR") across the chosen frequency range. According to certain embodiments of the present invention, the transmit and receive antenna elements of an array may be the same antenna.

The present disclosure addresses the issues with prior systems by deploying multiple antennas in an array configuration with unobstructed electromagnetic access to a formation outside of a casing, sequencing a transmitted signal to control the direction of transmission into the formation, receiving reflected signals, and locating the position of the reflection based on the scanned transmission signal orientation and the direction of the received signal. Such a deployment of an antenna array with unobstructed electromagnetic access to the formation outside of the casing, sequencing of the interrogation signal, and analysis of the received signal relative to the transmitted signal direction form the basis for reflection image rendering as the transmitted signal is scanned by a sequenced stimulus signal.

In one aspect, a system for mapping the fracture topology, orientation and location of proppant filled fractures in hydraulically fractured strata is described. According to one embodiment of the present invention, the system includes an apparatus comprising a surface control unit for control of a downhole antenna array. In some embodiments, the surface control unit further includes an image rendering system for receiving data derived images. The surface control unit also includes data and image storage, and communications modules. The apparatus can further include a cable bundle for interconnecting the surface control unit with a downhole tool providing a suitable supply of signal and power interconnections. The downhole tool can include a communication module for receiving transmission signal information from the surface control unit, along with a control module for sequencing the transmission signal into the transmit antennas to scan the direction of the transmitted signal. The downhole tool also includes a sensor for measuring signal reflection from the proppant filled fracture and a communication system for relaying signal reflection data to the surface control unit. The surface control unit may include a processor operational for analyzing and interpreting the return signals to locate proppant filled fractures within the formation; and be controlled to form images from multiple signal acquisitions adjacent to or in the vicinity of the wellbore.

In another aspect, a method for mapping the fracture topology, orientation and location of proppant filled fractures in hydraulically fractured strata is described. According to one embodiment of the present invention, the method includes, accessing a transmit antenna array projecting electromagnetic beams external to a wellbore casing and a receive antenna array having unobstructed electromagnetic access to a subterranean zone penetrated by the wellbore casing, and controlling and scanning the signal direction from the transmit antenna array by sequenced stimulus signals into the array. The method can further include detecting a return signal from the proppant filled fracture with the receiving antenna array which includes a plurality of antennas, the array being connected to a common time-base or local oscillator, and using signal characteristics, array characteristics and the geometric layout of that array to determine the direction and orientation of the return signal. In a further aspect in at least one embodiment, the method includes analyzing the return signal data to determine distance and geometric orientation of the proppant-filled fractures within the strata, and forming images from data generated from scanned return signals acquired adjacent to or in the vicinity of the wellbore.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one of ordinary skill in the art from the following detailed description.

BRIEF DESCRIPTION OF THE DRAWINGS

The accompanying drawings, which are incorporated with and form part of the specification, illustrate an embodiment of the present invention and, together with the description, serve to explain the principles of the invention.

FIG. 10A [Top] shows a dipole antenna element outside of a metal casing. The total radiation pattern [FIG. 10B Top] along with the vertical [FIG. 10A Bottom] and horizontal [10A Bottom] pattern components with a maximum gain of 7.18 dB.

DETAILED DESCRIPTION OF THE INVENTION

A system and method are described for providing images of a proppant filled fracture in a subterranean zone by positioning antenna arrays to extend beyond the casing within a borehole, scanning an interrogating electromagnetic beam across the proppant filled fracture, and receiving reflected signals from sequential scan positions to map the configuration of the fracture. In one embodiment, the antenna array is a phased array optimized for transmission into and reception from the lossy formation media.

According to one embodiment, the frequency range for radar energy used with the present system and method is 10 kilohertz ("kHz") to 30 gigahertz ("GHz"). According to other embodiments, the frequency range is 30 kHz to 10 GHz, or 300 kHz to 3 GHz. The foregoing frequency ranges are assumed throughout this description. One of ordinary skill in the art will appreciate that these frequency ranges are applicable to time-domain signals such as Gaussian pulses, chirped pulses, chirped linear frequency-modulated pulses and others whose frequency-domain profiles are obtained by taking the Fourier Transform of the time-domain signal. Such signals are advantageous for time-based distance determination and phased array behavior.

The beam width of an antenna or array power pattern is generally described by the half-power beam width ("HPBW") and the first-null beam width ("FNBW"). References to the electromagnetic beam of an antenna or array describe a truncated power pattern at the HPBW to form a narrow region of the pattern known as a beam. All terms pertinent to antenna or array engineering are disclosed as used in: "*FEEE 2$^{nd}$ Edition*", McGraw-Hill Publishing, 1980; and, T. A. Milligan, "*Modern Antenna Design 2$^{nd}$ Edition*", Wiley Interscience Publications, Wiley & Sons Publishing, 2005; and, C. A. Balanis, "*Antenna Theory 3$^{rd}$ Edition*", Wiley Interscience Publications, Wiley & Sons Publishing, 2005, which are hereby incorporated by reference in their entirety.

Figure 1:
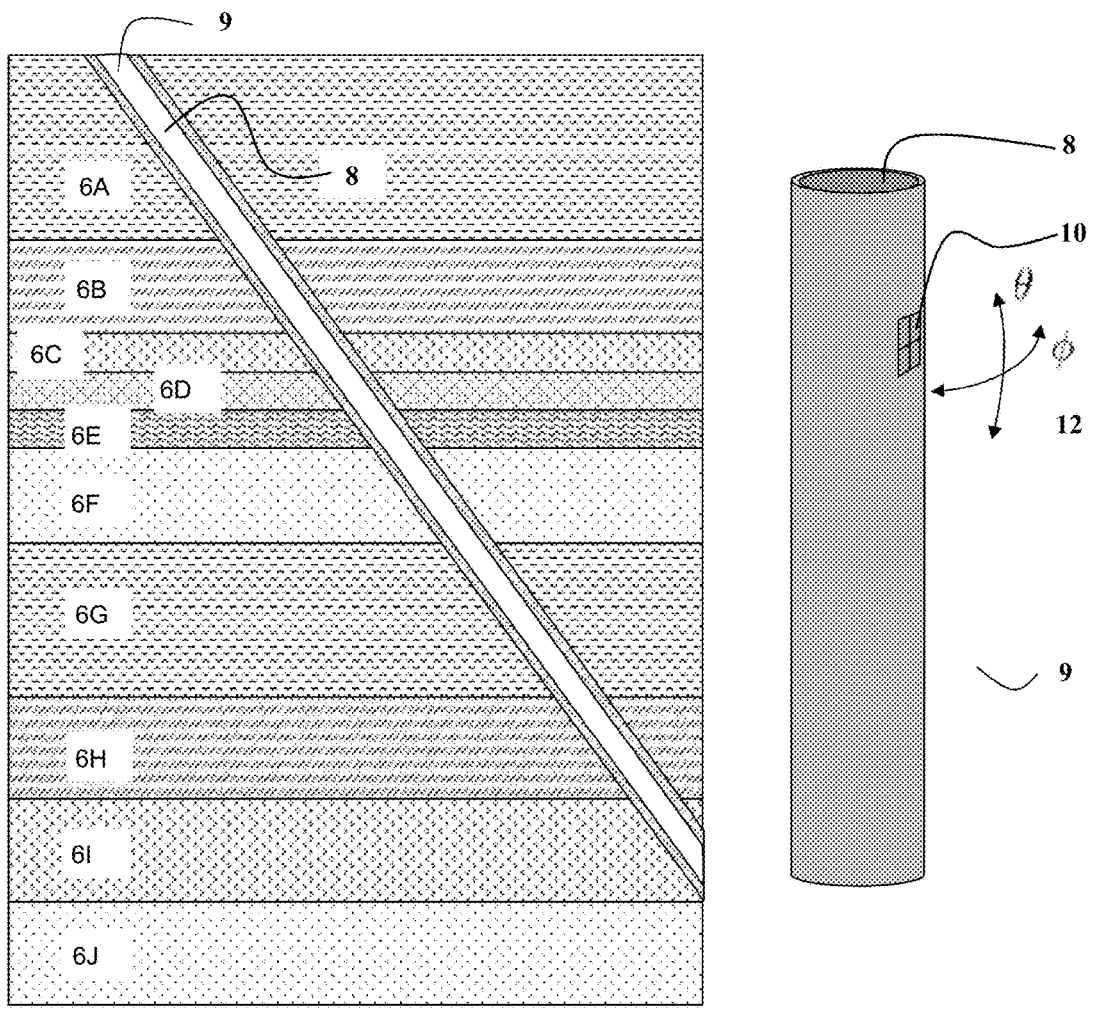
FIG. 1 is a diagram of the geometric layout of a real well vs. the layout of a reference well with an associated external antenna array.

Referring now to FIG. 1, a well 8 extends through geologic strata 6A-6J in a manner that has both vertical and horizontal components. Casing 9 extends within the well 8 and has an antenna array 10 located on the exterior surface thereof. Azimuth (denoted "Φ") and elevation (denoted "θ") angles 12 are defined by the reference of zero degrees along the surface normal of the geometric center of antenna array 10 and the longitudinal surface tangent (along the length of the casing 9), respectively. Further descriptions in other coordinate systems may be useful and such a description may be determined without limitation from the description embodied herein.

Figure 2:
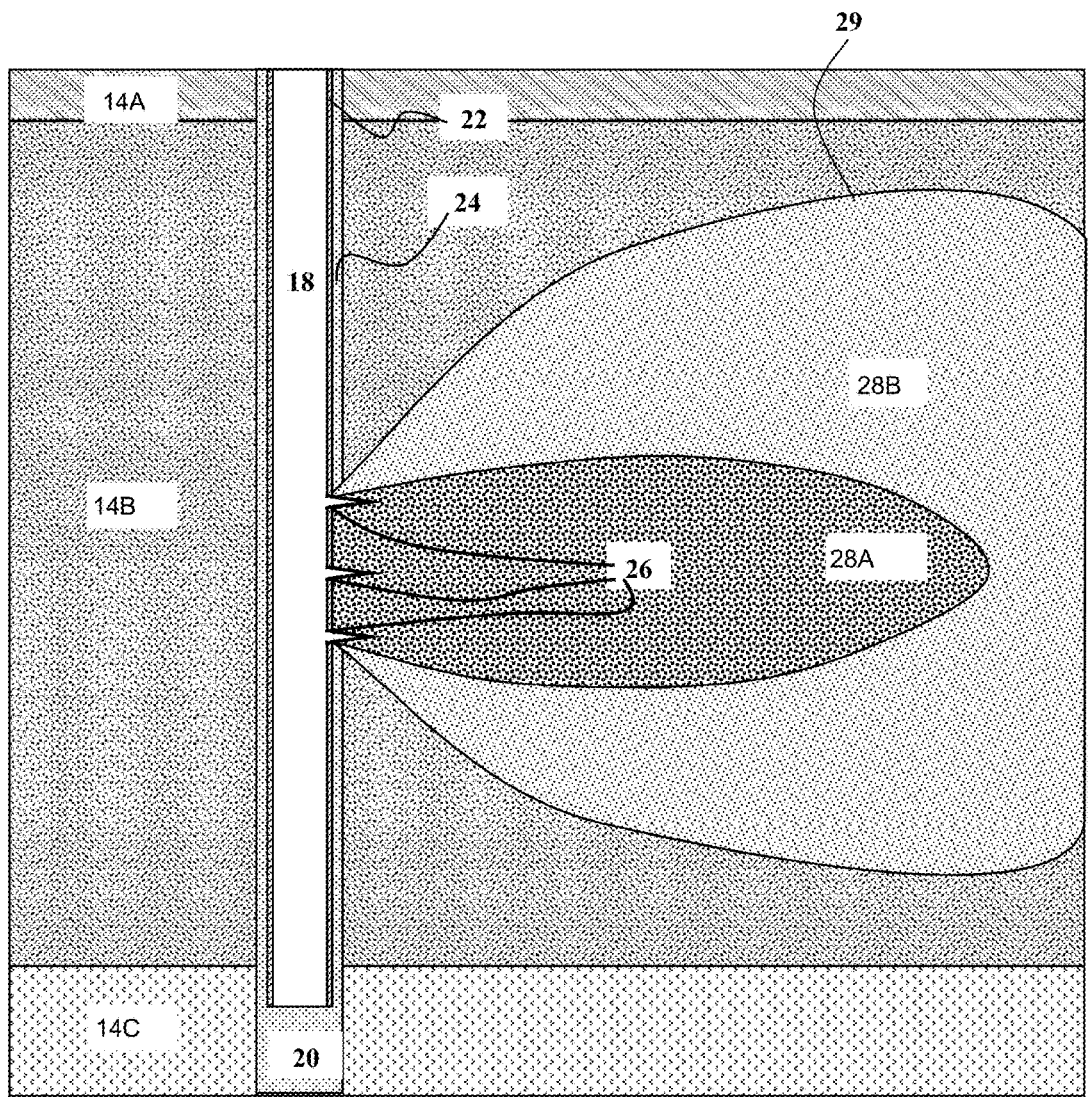
FIG. 2 is a schematic of an installed wellbore casing string traversing a hydrocarbon bearing zone with a proppant filled fracture.

Referring now to FIG. 2, a partial cutaway view is shown with a treatment well 18 that extends downward through one or more geological layers 14A-14C. While wells are conventionally vertical, the invention is not limited to use with vertical wells. Thus, the terms "vertical" and "horizontal" are used in a general sense in their reference to wells of various orientations.

The preparation of treatment well 18 for hydraulic fracturing typically comprises drilling a bore 20 to a desired depth. Casing 22 is cemented 24 into well 18 to seal the bore 20 from the geological layers 14. The casing 22 has a plurality of perforations 26. The location of perforations 26 may be at any desired depth within well 18, but are typically at the level of a hydrocarbon bearing zone in the geologic layers 14, which may be within one or more of the geological layers 14A-14C. The hydrocarbon bearing zone may contain oil and/or gas, as well as other fluids and materials that have fluid-like properties. The hydrocarbon bearing zone in geologic layers 14A-14C is hydraulically fractured by pumping into casing 22 and through perforations 26 at sufficient rates and pressures a fluid to create a fracture 29 and then incorporating into the fluid a proppant 28A or 28B which will prop open the created fracture. According to one embodiment, a high-viscosity polymer fluid is used as a carrier fluid wherein a first portion of the proppant injected into the created fracture is untreated proppant 28B, so as to form a propped fracture of baseline reflectivity, and the remaining portion of the proppant 28A injected into the created fracture is treated to increase electromagnetic reflectivity so as to form a propped fracture portion with increased reflectivity. It will be appreciated that the illustration in FIG. 2 shows a distinct separation between the treated proppant 28A and untreated proppant 28B, however it is anticipated that significant mixing could occur so that these two proppant types are only distinguishable by a distinct change in bulk electrical conductivity of the fracture from one area to the next.

The hydraulic fracture in FIG. 2 is oriented longitudinally along the metallic well casing. This orientation is exemplary in nature. In practice, hydraulically-induced fractures may be oriented longitudinal [as in FIG. 2], transverse to the well orientation [as in FIG. 8, 9, 17] or intermediate between the two. Various orientations are exemplary and not intended to restrict or limit the invention in any way.

In a further embodiment, the previous process can be combined with industry standard fracture analysis technologies, such as radioactive tracers and micro-seismic surveys, to acquire additional data about fracture location, fracture height and other useful characteristics that shall be easily ascertained by one of ordinary skill in the art.

According to one embodiment, ground penetrating radar is used to detect and image fractures formed adjacent to a metal casing during a fracturing operation. According to this embodiment, antennas are deployed external to the metal casing, or are otherwise unobstructed by the casing, which enables the transmission of the radar signal into the formation and reception of reflected signals from the formation. Also, according to this embodiment, the transmission is controlled such that location specific reflections are received and interpreted so as to form an image. Two exemplary methods for deploying antennas outside of the metallic casing, are presented below for exemplary purposes.

Figure 3A:
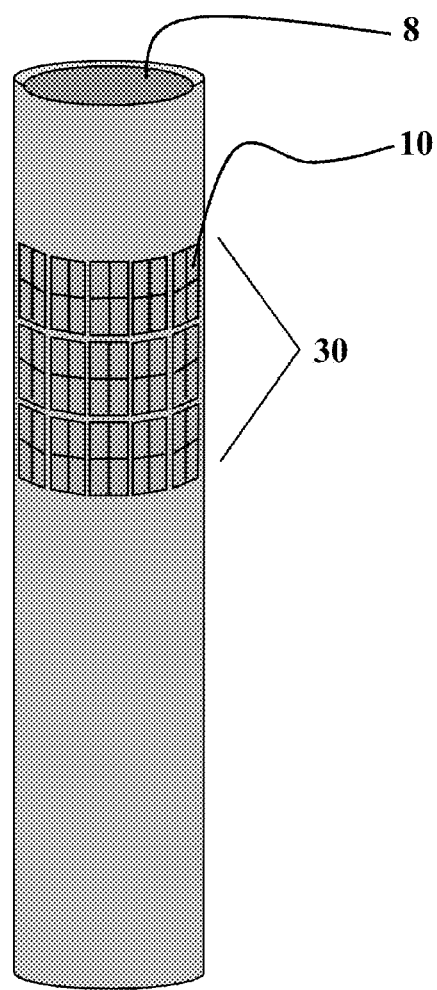
FIG. 3A is a diagram of an antenna array constructed on the external surface of a metal casing segment; such construction being performed prior to the installation of the casing string in the borehole.

Referring now to FIG. 3A, an example is shown of an antenna array 30 positioned on the metal casing exterior. U.S. Pat. No. 6,714,153 teaches the deployment of multiple antennas permanently positioned on the metal casing exterior and is hereby incorporated by reference in its entirety. This kind of deployment accomplishes positioning antennas outside of the metal casing, but does not disclose components of functionality related to controlling these antennas as an array. This particular deployment method is permanent and can not be repositioned to new locations along the borehole string. In addition, the control system operating the antenna is deployed at the surface and signals are delivered downhole by a series of cables extending along the exterior of the casing.

Figure 3B:
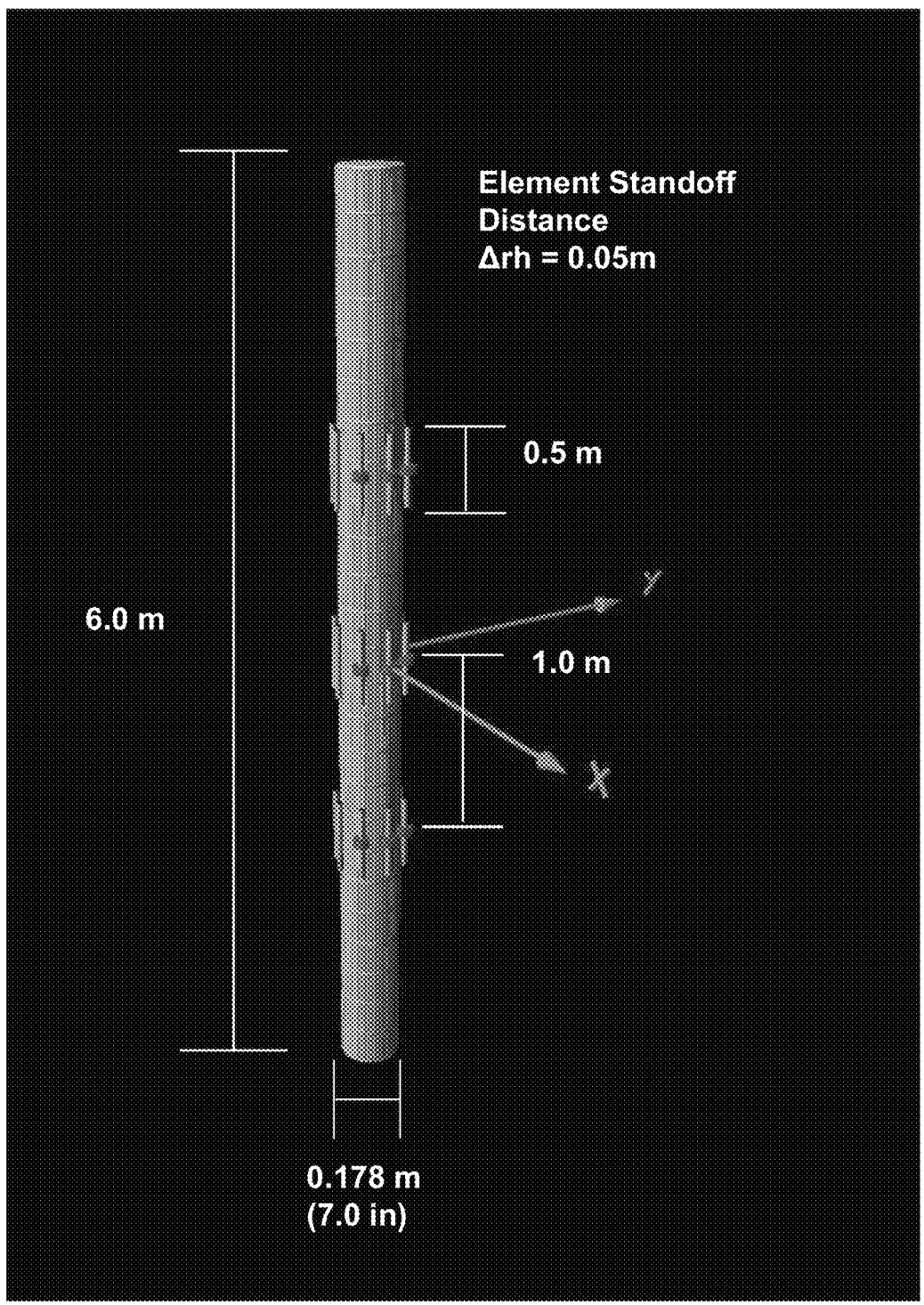
FIG. 3B is a CAD wire model of a metal casing with a dipole antenna array fixed on the external surface of a metal casing segment. Active elements of an array sub-division indicated by the central protrusion are shown against the inactive elements of the full array.

Referring now to FIG. 3B, an exemplary array is constructed of rings of casing-mounted half-wave dipole antennas separated azimuthally by 45° and designed to operate at 300 MHz—separated by a center-to-center distance of 1 meter or 1 free-space wavelength ($\lambda_0$). This design enables a signal to be sent in a narrow direction—thus, these rings are designed so that only a small section of the ring is active at a given time.

The rings are divided into 90° subsections, which contain 3 dipoles in each 90° segment. A radiating sub-array uses 3 ring subsections of 3 rings—forming a 3×3 radiating sub-array. One sub-array is active at a time.

Figure 4A:
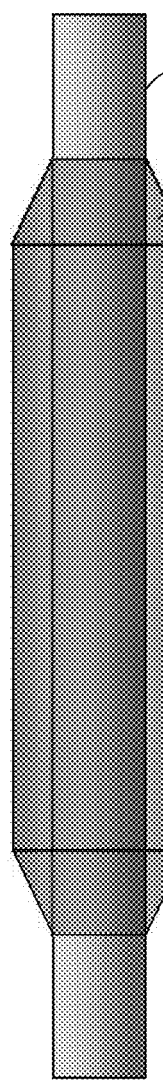
FIGS. 4A-4C are diagrams of an engineered gland module on a metallic casing string designed to accept antenna and antenna array insertion from a downhole tool.
Figure 4B:
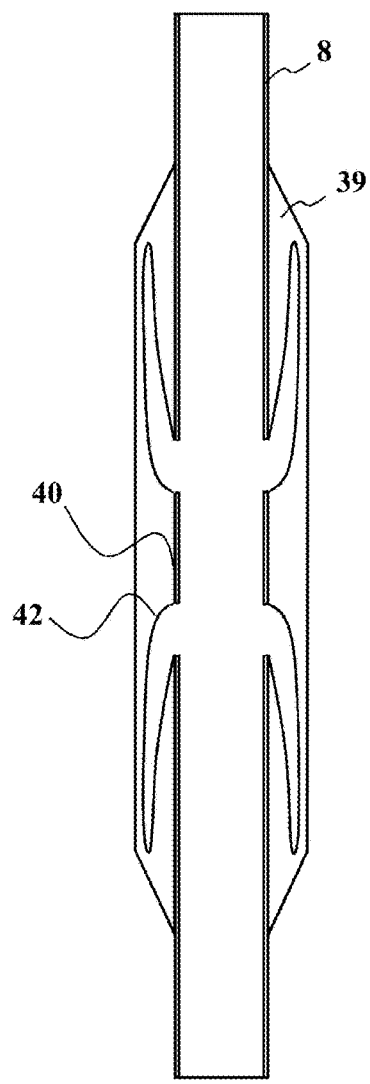
Figure 4C:
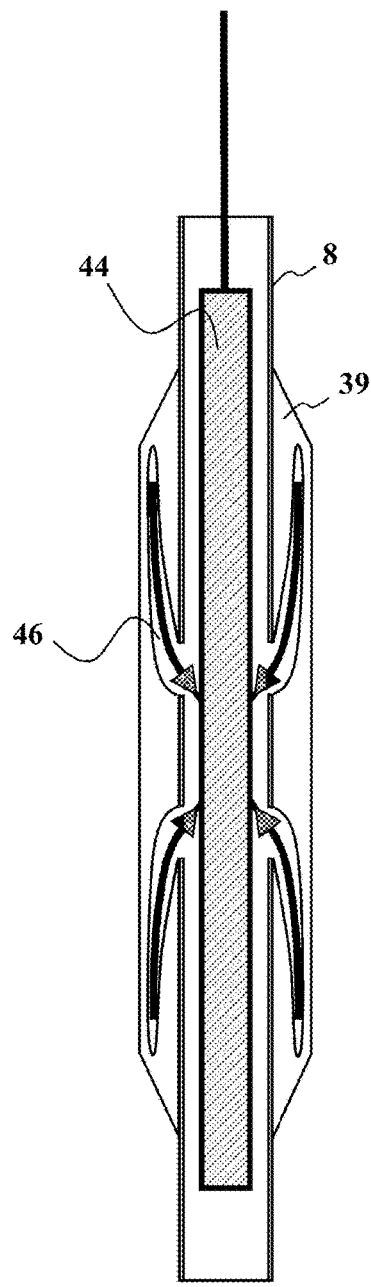

Referring now to FIG. 4, an apparatus comprising a metal casing section modified to allow antenna insertion from within the casing string to positions outside of the casing may facilitate methods for imaging proppant filled fractures. The integrity of cased borehole installations can be a primary concern, especially with respect to the isolation of the casing interior from the surrounding formation fluids and pressures. FIG. 4A shows a housing 39 comprising a dielectric material to permit transparency to RF waveforms mounted on the outside of a casing section 8. The dimensions of housing 39 are shown as enlarged relative to the casing segment 8 for the purpose of illustration. FIG. 4B shows the housing 39 to include glands 42 in the housing aligned with apertures 40 in the casing string section. FIG. 4C shows a downhole tool 44 extending antennas 46 into the glands. This design accomplishes the requirement of deploying antenna arrays outside of the metal casing while maintaining the integrity of the casing from the surrounding formation. The installation of multiple glandular housing sections along the casing string allows the observation of the formation from multiple positions on the string to be performed by a single antenna array.

The antenna deployments indicated in FIGS. 3 and 4 are examples of deployment methods which position antenna arrays outside of the metallic casing string. Positioning antenna, either outside the casing, through apertures in the casing, or within electromagnetic lucent casings to provide an unobstructed view of the formation provides better data collection for use in a system and method for mapping the proppant fracture field to form an image.

According to an embodiment of the present invention, fracture features are imaged from a single wellbore by insertion and deployment or by deployment of antennas in array configurations on the outside of the metal casing, both in the cylindrical dimension and in the depth dimension. The arrays may be generated comprising the deployment of multiple antennas to form an array or by deployment of monolithic array devices. The specific array configurations to form directed beams of electromagnetic radiation and scan them into the formation may be determined by one of ordinary skill in the art of antenna array design, but is at least an array of two antennas spaced apart on the casing. Deployment of the transmit antennas in array configurations combined with appropriate signal sequencing to create a scanned electromagnetic beam and deployment of receive antennas to discriminate phase behavior or time of flight of the reflected signals enables triangulation of reflector position with appropriate signal analysis algorithms. The signal analysis algorithms and software described below enable the desired image formation.

According to one embodiment, the signal source and signal reception circuits are contained within the downhole tool, and are connected to the deployed antennas and to the surface by a combination of optical cabling for data communication and electrical conductor wiring for power supply requirements. According to a further embodiment, the system is connected to the surface by a four-conductor cable where the cable would serve both power and communication purposes. Both embodiments describe cabling that is standard to the industry and well-known to one of ordinary skill in the art.

According to such embodiments, the downhole tool 44 locates apertures 40 in the casing 8 using magnetic or optical tags which are attached to the casing sections containing the apertures to insert the antennas 46 beyond the surrounding casing 8 into the glands 42. Indexing to the insertion positions is accomplished by standard methods known in the art.

Figure 5:
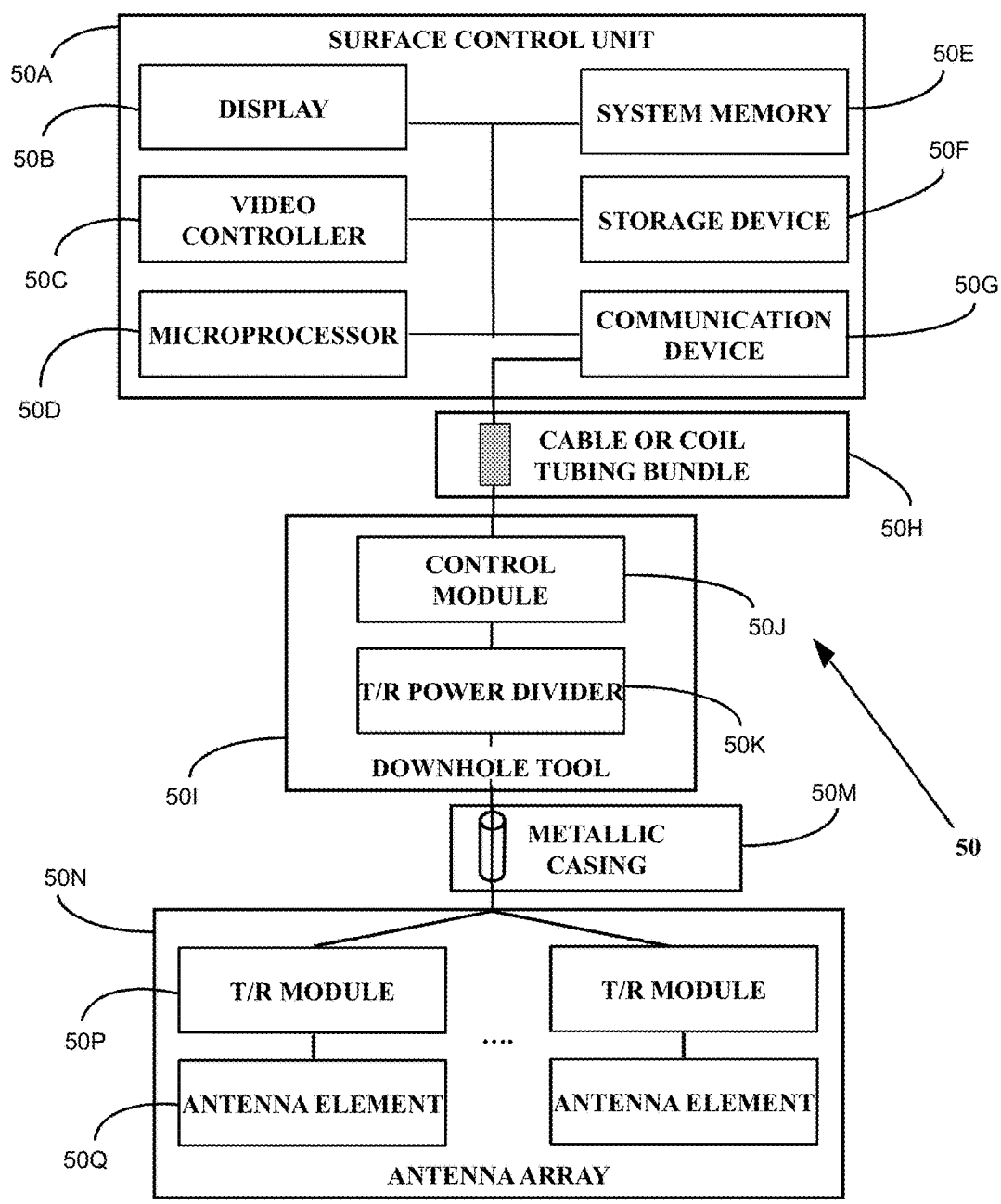
FIG. 5 is a diagram of a system for scanning a formation to form an image.

Referring now to FIG. 5, a system 50 can be used to conduct mapping of the proppant filled fracture. In one embodiment, surface control unit 50A is attached to a wireline 50H that extends into well 18, connecting to downhole tool 50I. The downhole tool 50I may be used to locate and contact antenna arrays 50N deployed outside the metallic casing 50M and provide electrical connection through the metallic casing 50M to the antenna arrays 50N.

Surface control unit 50A includes a display 50B, a video controller 50C, a microprocessor 50D, a system memory 50E, a storage device 50F, and a communication device 50G. Surface control unit 50A comprises a control module for a ground penetrating radar (GPR) system.

According to certain embodiments of the present invention, the wireline 50H uses a fiber optic cable infrastructure for signal transmission to minimize signal degradation in deep wellbores as compared to coaxial cables. Wireline 50H may also be conveyed in conjunction with a coiled tubing system. According to one embodiment, the signal source and signal reception circuits are contained within the downhole tool 50I, and are connected to the deployed antennas and to the surface by a combination of optical cabling for data communication and electrical conductor wiring for power supply requirements. According to a further embodiment, the system is connected to the surface by a four-conductor cable where the cable serves both power and communication purposes. Both embodiments describe cabling that is standard to the industry and well-known to one of ordinary skill in the art.

In one embodiment, the downhole tool 50I comprises a control module 50J and a transmit/receive (T/R) power divider 50K. The control module 50J is an operator-controlled interface module which: receives execution prompts from and transmits operational results to the surface control unit 50A and sets the input signal voltage to and controls the amplitude sequence of T/R power divider 50K.

In another embodiment, downhole tool 50I may be configured to deploy antenna arrays through apertures in the metallic casing and provide connection to said antenna arrays. These operations may be performed by a single downhole tool or in stages by multiple downhole tools; each providing some subset of the required operations. It is to be understood that references to the "downhole tool," herein include operations performed by a single tool or sequential operations of a similar nature performed by multiple tools.

In one embodiment, the antenna array 50N includes T/R modules 50P and antenna elements 50Q. In this embodiment, the control module 50I controls the time-delay sequence of T/R modules 50P; and, controls the complex impedance values of the adaptive matching networks attached to antenna elements 50Q.

The antenna array 50N may be assembled by the deployment of multiple antennas to form an array or by deployment of monolithic array devices. The specific array configurations to form directed beams of electromagnetic radiation and scan them into the formation may be determined by one of ordinary skill in the art of antenna array design, but is typically at least an array of two antennas spaced on the casing. Deployment of transmit antennas in array configurations combined with appropriate signal sequencing to create a scanned electromagnetic beam and deployment of receive antennas to discriminate phase behavior or time of flight of the reflected signals enables triangulation of reflector position with appropriate signal analysis algorithms.

Signal transmission and reception may be performed from a single antenna array, known in the art as a monostatic configuration; or by use of separately deployed arrays for each of the signal transmission and signal reception roles, known in the art as a bistatic configuration. References to antenna arrays in this specification may be applied to either configuration, except where noted for specific embodiments.

Antenna elements 50Q are configured to transmit maximum energy. Key aspects of the invention are to transmit an electromagnetic signal in a controllable direction into a geologic formation containing a proppant filled fracture and to be able to scan the direction of transmission. Such a directed scan capability is realized in the apparatus by sequenced stimulus signals sent to an array of more than two antennas arranged outside of the metallic casing so as to produce a narrow composite beam width, wherein the direction of projection is scanned with appropriate stimulus sequencing of the phase, time-delay or other aspects known in the art. As such, the transmit antenna array 50N is a directionally-controllable high-gain transmitter. The antenna elements 50Q and antenna arrays 50N are designed to use the metallic casing as a reflective backplane and to have physical dimensions consistent with the backplane geometry, which, in one embodiment, is approximately 3 inches to 36 inches in diameter, in another embodiment is 4 inches to 24 inches in diameter, and in yet another embodiment is 4 inches to 12 inches in diameter.

The transmit array construction determines an optimal transmission frequency range for the specific geologic media in a particular wellbore and produces transmission of a signal within the optimal frequency range for signal propagation and reflection. To enable the determination of an optimal transmission frequency and other transmission characteristics of the geologic media, the transmit antenna broadcasts over the range of 10 kHz to 30 GHz, 30 kHz to 10 GHz, or 300 kHz to 3 GHz. Reflected signals from such broadcasts are received by one or more receive antenna arrays, which signals are then interpreted to determine the location in space of the reflective intersection of the transmitted beam with the proppant filled fracture. The spectral ranges which have the highest transmission and reflection amplitude are chosen for use in the well region.

In one embodiment, to enable the broadcast of a signal with a frequency range for transmission and signal reflection optimized to the spectral response characteristics of the geologic media, the transmit antenna array broadcasts pulsed wavelets with frequency characteristics described above.

In an alternative embodiment, the antenna arrays broadcast an optimized pulsed signal in the time-domain by performing the previously described frequency optimization followed by matching the spectral content of a pulse to the optimal spectral response characteristics of the geologic media.

According to embodiments of the present invention, optimization of the transmission frequency minimizes absorptive losses in the varying impedance domains of the geologic media encountered in various near-wellbore regions, and the inverse dependence of target reflectivity on signal wavelength. The specific values of these impedance properties allow one of ordinary skill in the art to minimize internal reflections on the antenna system due to impedance discontinuities.

According to other embodiments of the present invention, the transmit antenna elements 50Q are dipole or monopole antennas, which are most commonly used in impulse radar systems. Such dipole and monopole antennas can generate high-purity pulses when resistively loaded and fed through a balun. Such dipole and monopole antenna elements are widely used in impulse systems due to their predictable radiation pattern.

According to certain embodiments of the present invention, the receive antenna arrays 50N are designed to have maximum signal reception sensitivity in the preferred frequency range and maximum angular reception discrimination.

According to other embodiments of the present invention, the receive antenna elements 50Q are resistively-loaded dipole or monopole antennas.

According to certain embodiments of the present invention, the signal is first received on the antenna array 50N, then passed through the receiver circuitry to an A/D converter where it is converted into standard 12-bit data then on to a control module 50J which incorporates ancillary data (such as antenna tag number, relative antenna orientation, etc. . . . ) into a data packet which is then relayed to an optical transmitter and conveyed to the surface via optical fiber channels where it is received and processed. Such fiber-optic relay methods for other types of data are standard in the industry and well-known to one of ordinary skill in the art.

According to other embodiments, the data packet is passed from the control module to an audio transmitter which converts the electronic bit data into a representative audio-modulated signal and conveyed to the surface via standard electric conductor lines. Such audio-relay methods are standard in the industry and well-known to one of ordinary skill in the art.

In a further exemplary embodiment, the system 50 includes a microprocessor 50D, a storage device 50F, a video controller 50F, a system memory 50F, a display 50B, and a communication device 50G all interconnected by one or more buses. In several exemplary embodiments, the storage device 50C may include a floppy drive, hard drive, CD-ROM, optical drive, any other form of storage device and/or any combination thereof. In several exemplary embodiments, the storage device 50C may include, and/or be capable of receiving, a floppy disk, CD-ROM, DVD-ROM, or any other form of computer-readable medium that may contain executable instructions. In several exemplary embodiments, the communication device 50G may include a modem, network card, or any other device to enable the system 50 to communicate with other nodes within a network. In several exemplary embodiments, any node represents a plurality of interconnected (whether by intranet or Internet) computer systems, including without limitation, personal computers, mainframes, PDAs, and cell phones.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

Figure 6:
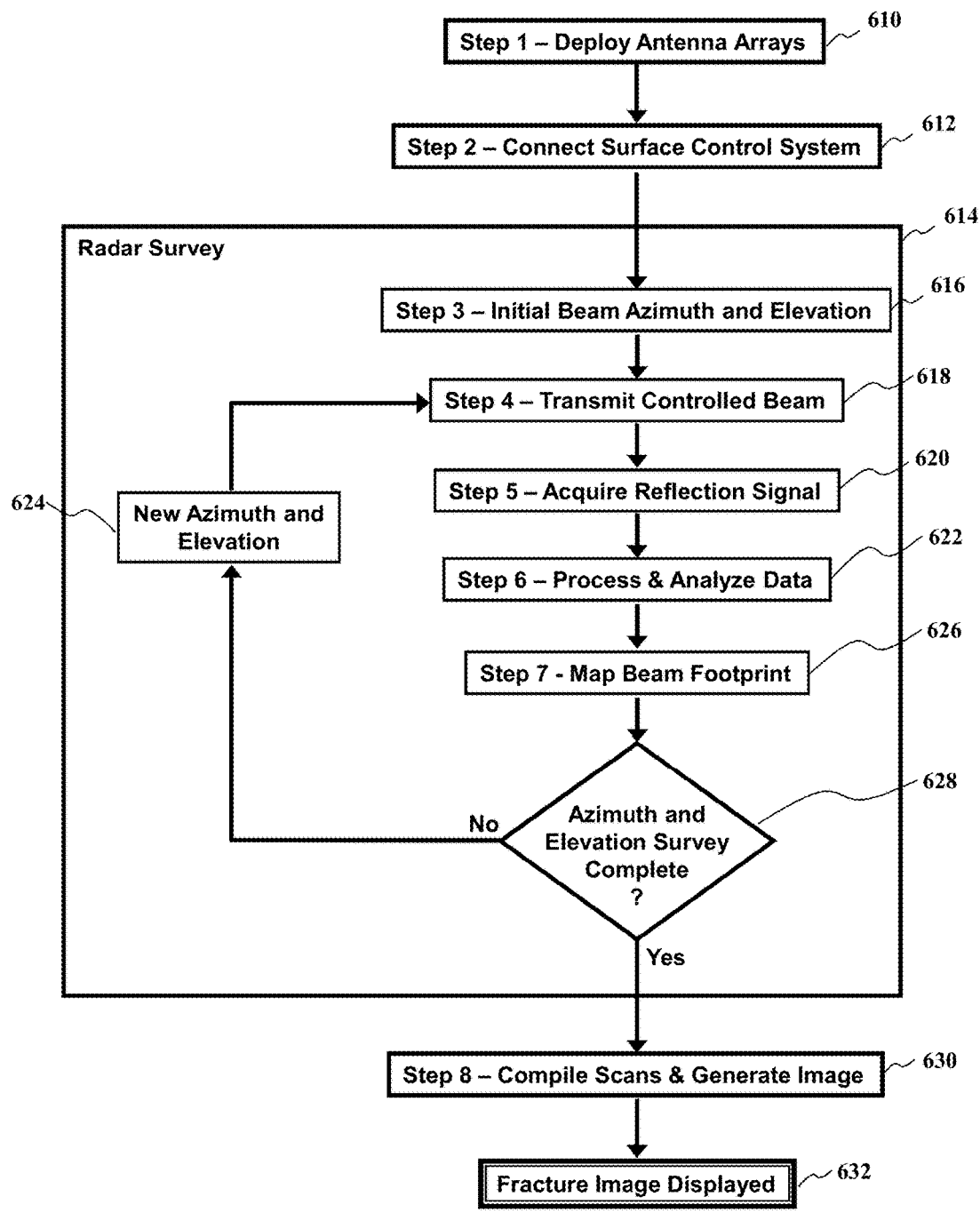
FIG. 6 is a diagram of a method of scanning a formation containing a proppant filled fracture to form an image of the proppant filled fracture.

FIG. 6 shows the sequence of operational steps to scan a formation with a radar beam and create a map of the fracture network from the reflected waveform.

The mapping operation contains three basic sequential elements.

First, antenna arrays are positioned at step 610 with EM line of sight into the formation and connected to a surface based control system at step 612.

Second, a radar survey loop at step 614 is conducted by repeating the sequence of directing a radar beam in a particular direction (determined by the projection azimuth and elevation angles) into the formation, receiving reflection signals for that beam orientation, and analyzing the reflection signals using the physical optics of the transmission and reflection paths. After the sequence is completed at a specific azimuth and elevation setting, the projection angles are changed and the sequence is repeated. The repetition of the transmit/receive sequence at a sufficient number of directions into the formation space surrounding the casing string produces information characteristic of the fracture network within EM range of the casing.

Third, the positional reflection data from the individual scan positions are combined to create a map of the reflection in space. This combination produces a map of the fracture network as a composite of the position dependent reflections.

The individual steps are described below.

1. Deploy Antenna Arrays 610:

The use of antenna arrays in contrast to individual antennas is necessary to confine and scan transmitted beams through the fracture containing formation. Individual antennas project energy in essentially static fields, which can not be directed in particular directions. So, antenna arrays are used to create directionally indexed image information.

The antenna arrays may be deployed using several methods, including:

Antenna arrays are pre-positioned on the outside of the casing prior to installation of the casing into the borehole. In this case, appropriate electrical connections through the metallic casing are available for connection of the antenna elements to a downhole tool, which provides subsequent connection to a surface based system controller.

Antenna arrays are deployed through apertures in the metallic casing by a downhole tool. To maintain isolation of the casing string interior from the external reservoir fluids, a dielectric housing is installed over the aperture; thus, providing a receptacle for deployment, line of sight into the formation, and isolation of the casing interior.

2. Connect Surface Control System 612:

After the antenna arrays are deployed in position proximate to the fracture, a downhole tool is lowered into proximity of the array positions and connections are established to the antennas. This tool string connection provides power and signal transfers between the control unit on the surface and the deployed antenna arrays. The required tool string technologies are currently available and may be adapted to the present system.

3. Set Initial Beam Azimuth and Elevation 616:

The first step in the radar survey loop is to set the initial direction for the first signal acquisition. The ability to direct the radar signal in specific directions in the formation allows the formation to be scanned. The projected signal is primarily within a cone, where the axis of the cone relative to the casing string can be set by proper phasing sequence into the antenna array. The azimuth of the beam is the angular position of the axis of the emission cone around the circumference of the casing string. The elevation of the beam is the angle between the cone axis and the casing string axis.

4. Transmit Controlled Beam 618:

Radar signals are selected to provide the most readily analyzed and useful information in subsequent reflections, and vary from monotonic frequency continuous waves, to engineered wave packets, to pulses. Any of these kinds of signals can be directed from antenna arrays; the choice being dependent on the characteristics of the medium and target. The projected beam in general will have an elliptical conic shape; that is, a cone which has an elliptical base.

5. Acquire Reflection Signal 620:

The reflection signal contains the information which is diagnostic of the fracture plane location and configuration. The raw signal is received by the receiving antenna array. Reflection signals are simple individual signals as would be received by each of the array elements. Receiving arrays which are the same as the transmitting array (monostatic) and receiving arrays which are separate from the transmitting array (bistatic) offer additional and distinct system signal analysis options.

6. Process & Analyze Data 622:

Raw signals received on the antenna arrays may receive a first level of processing within the downhole tool, depending on the hardware architecture, and are subsequently transmitted up the tool string to the surface control system for final analysis.

7. Map Positional Beam Footprint 626:

The reflected waveform is interpreted to create a spatial mapping of the intersection of the projected beam with the fracture plane.

8. Azimuth and Elevation Survey Complete 628:

After step 626, the system evaluates at step 628 whether all azimuth and elevation surveys have been completed. If additional scans are needed, the method continues at step 624 by selecting a new azimuth and elevation for the next beam. If all azimuths and elevations have been scanned, then the method moves to step 630.

9. Compile Scans & Generate Image 630:

After the radar survey loop is completed for the specified azimuthal and elevation coordinates, the individual reflection maps are combined to create an image of the fracture plane within the range of sight of the combined radar projections. The image is displayed for the operator's reference at step 632 and can be communicated and stored in digital format.

The procedures described in this operation provide a solution to map fracture networks formed by hydraulic fracturing from a borehole.

Figure 7A:
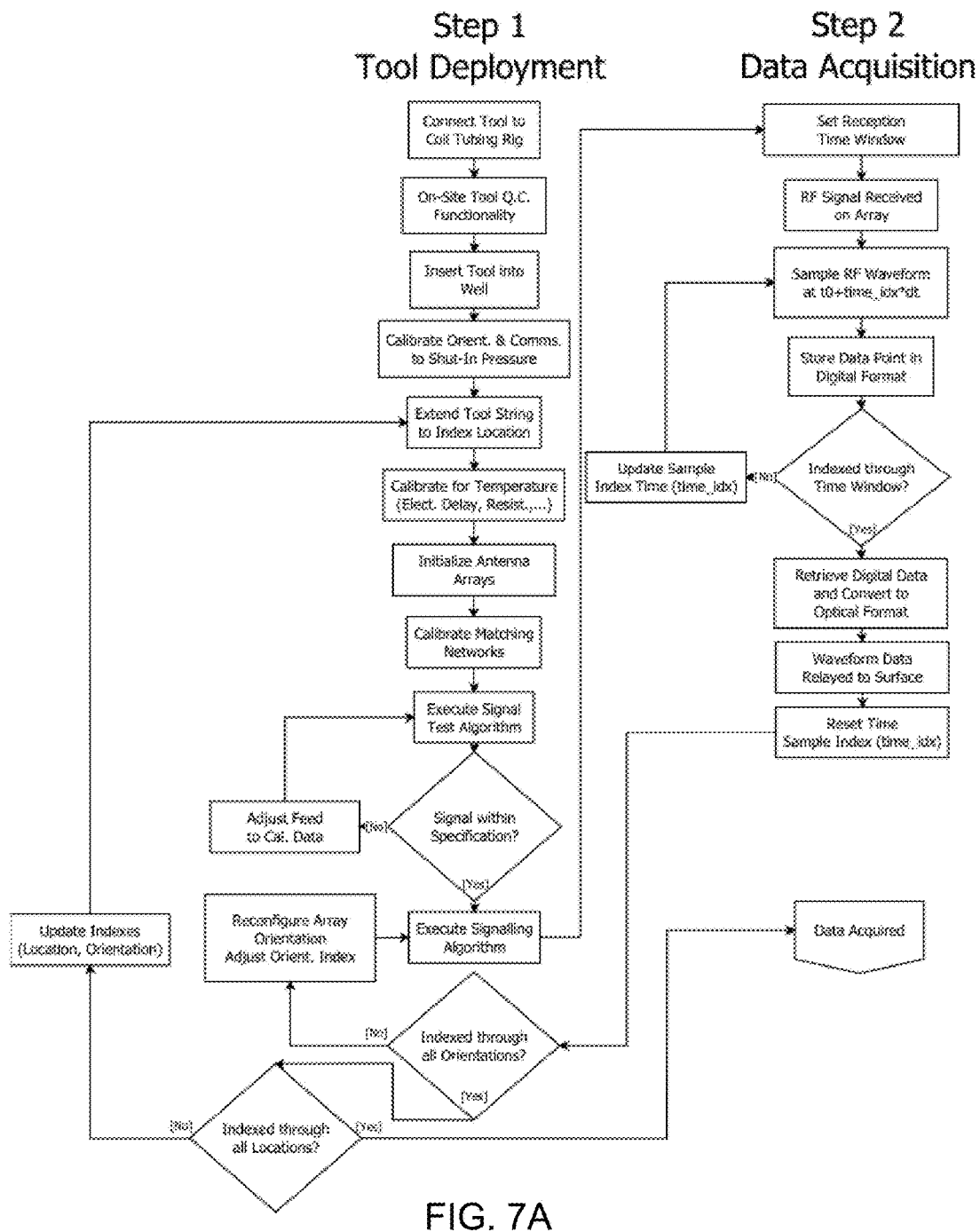
FIGS. 7A and 7B are exemplary process flows for scanning a formation containing a proppant filled fracture to form an image of the proppant filled fracture.
Figure 7B:
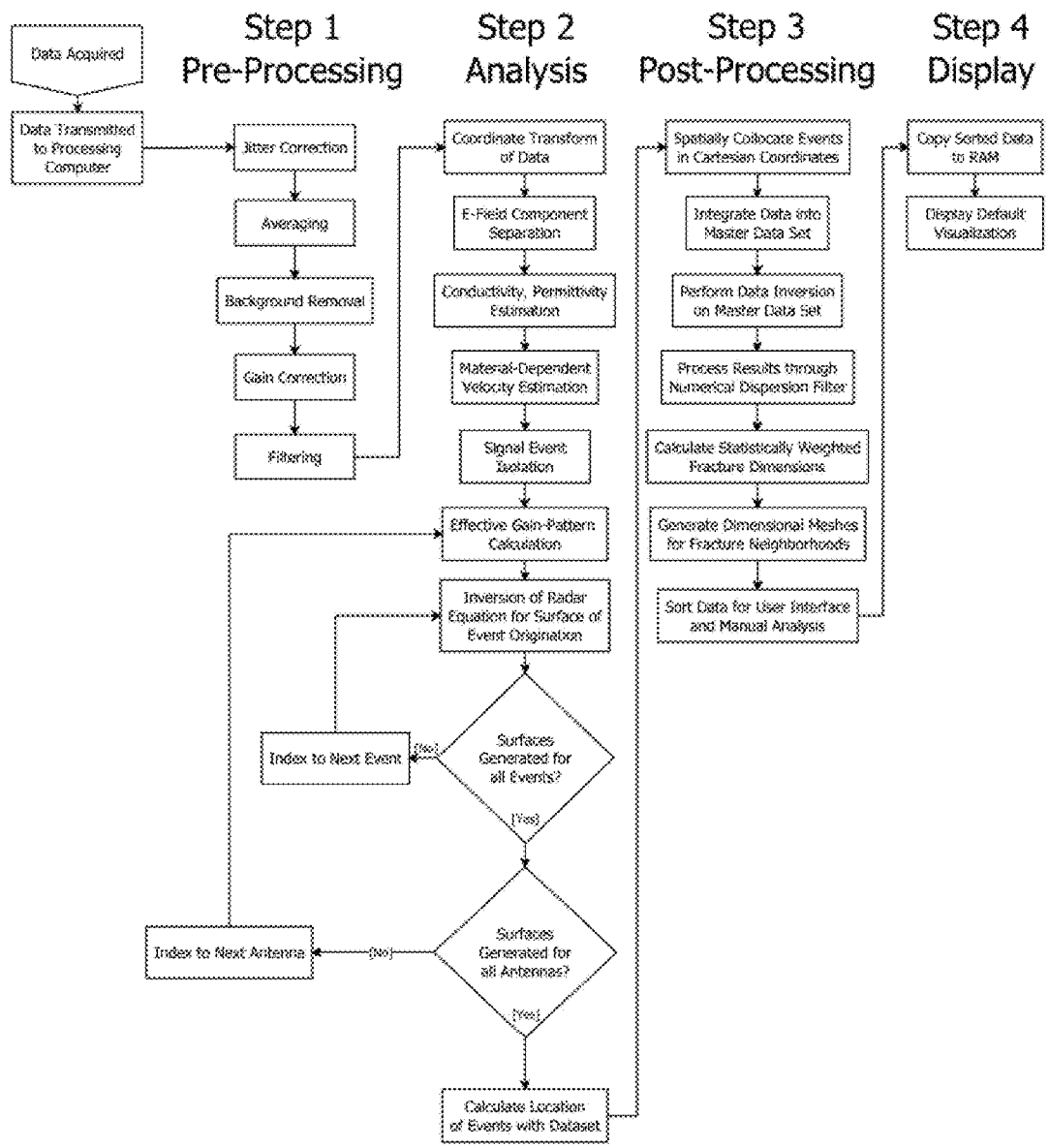

Referring now to FIGS. 7A and 7B, an exemplary process flow for mapping the fracture topology, orientation and location of proppant filled fractures in hydraulically fractured strata is described. FIG. 7A shows the first two sequential steps related to tool deployment and data acquisition. As set forth in detail in FIG. 7A, the antenna array is located in the appropriate position in the wellbore and is calibrated to the surrounding environment. Once the array is properly calibrated, the signaling algorithm is executed to acquire data through a series of angular orientations. FIG. 7B shows the sequential steps related to analyzing the acquired data to form an image of the reflections obtained from the proppant filled fracture. This sequenced process flow is offered as one example of a specific procedure to interrogate a proppant filled fracture so as to form an image of the fracture.

In one embodiment, image rendering using information obtained by sequenced transmission and reception from a single well bore is accomplished with algorithms designed to interactively scan the beam from a multiple antenna array through a set of angular orientations and antenna positions intersecting the proppant filled fracture, analyze reflected signals at each scan position, and form images based on a composite of the reflected signals from each scan position. Incremented scanning of the transmission beam enables reflective location assignment within the footprint of the intersection of the beam with the fracture region; and the composite of scanned reflection points produces the desired image rendering of the proppant filled fracture. Such interactive scanning of the electromagnetic beam and analysis of signal return at each scan position is one aspect of a method for rendering images of proppant filled fractures having unknown orientation and contours relative to the path of the metal casing string.

Figure 8:
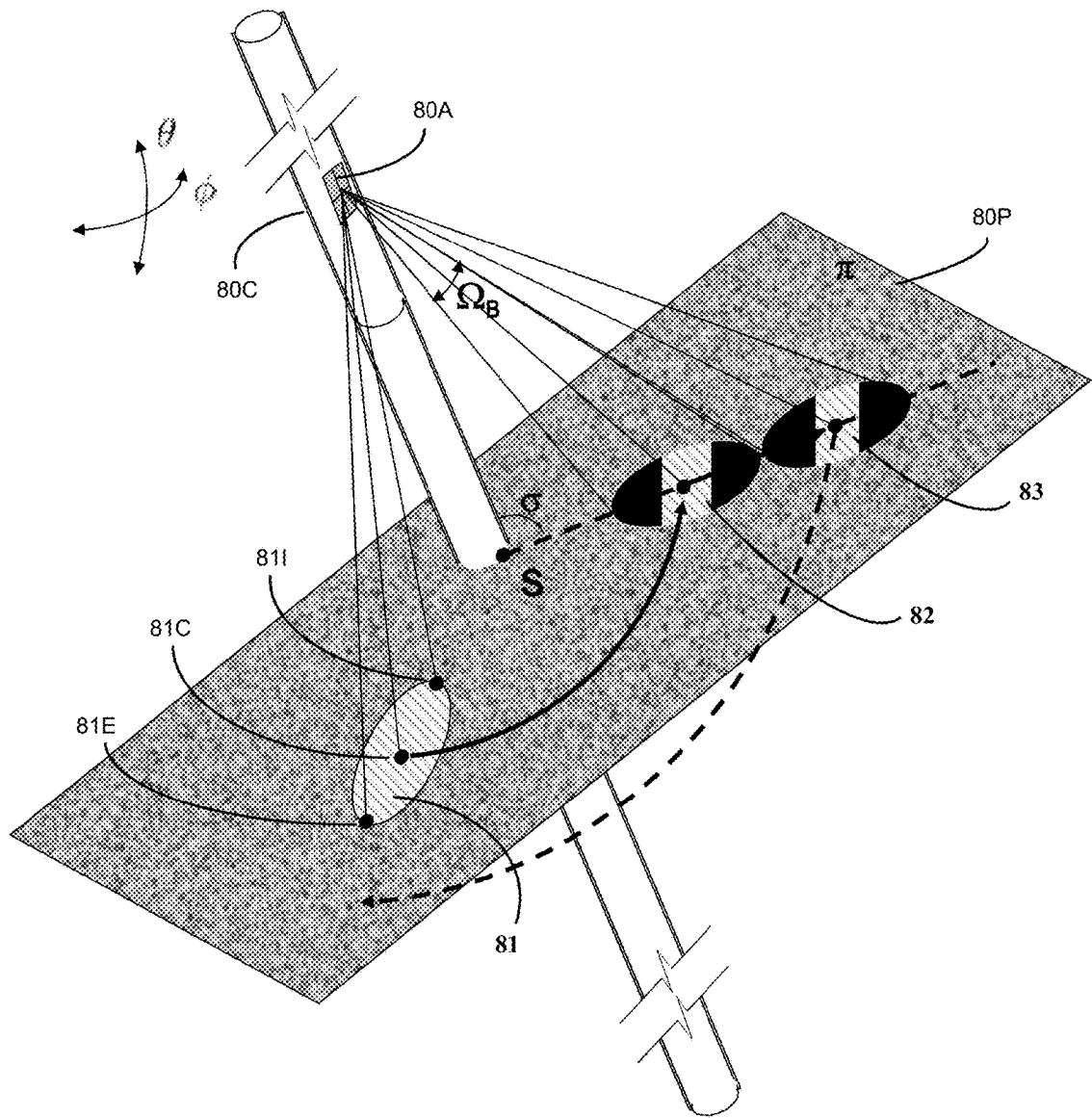
FIG. 8 is a schematic of a mono-static beam scanned along a proppant filled fracture.

Referring now to FIG. 8, one embodiment of the present invention comprises a monostatic antenna array 80A positioned proximate to a proppant filled fracture 80P. In this embodiment, proppant filled fracture plane 80P extends from metallic borehole casing 80C. An electromagnetic signal with beam width $\Omega_B$ is transmitted from the array through the adjacent formation and intersects fracture plane 80P across an area 81. Illumination area 81 has a center located at 81C. The longest beam path strikes area 81 at 81E, and the shortest beam path intersects at 81I. Back reflected signals resulting from reflection of the electromagnetic beam at 81 follow return paths to the array along the same transit lines, and are received at the array with signal delay times proportional to the path lengths. The first detected signal results from reflection at 81I and the last detected reflection results from reflection at 81E. Knowledge of the controlled beam transmission direction and signal analysis of the reflections determines the location in space of illumination area 81. The beam is subsequently directed with a new azimuthal coordinate to position 82 on the fracture plane 80P, and the signal analysis is repeated. The beam is subsequently directed with a new elevation coordinate to position 83, and the signal analysis is repeated. Successive beam step and signal analysis produces an image of the fracture plane 80P on the control display 50B shown in FIG. 5.

In an alternate embodiment, separate antenna arrays 80A may be positioned on metallic casing 80C proximate to a proppant filled fracture, such arrays performing the discrete functions of signal transmission and signal reception. It should be apparent to one of ordinary skill in the art that such a bistatic configuration similarly may be used to produce a scanned image of proppant filled fracture plane 80P. The bistatic elements may be located on the same side of the metallic casing string relative to the position of the proppant filled fracture plane or on opposite sides relative to the proppant filled fracture plane.

In a further embodiment, array elements may be positioned around the circumference of the metallic casing, and activated in sub-arrays to optimize the field of view around the casing. This procedure is duplicated for circumferential sub-arrays such that the 360 degree field of view may be mapped.

Figure 9:
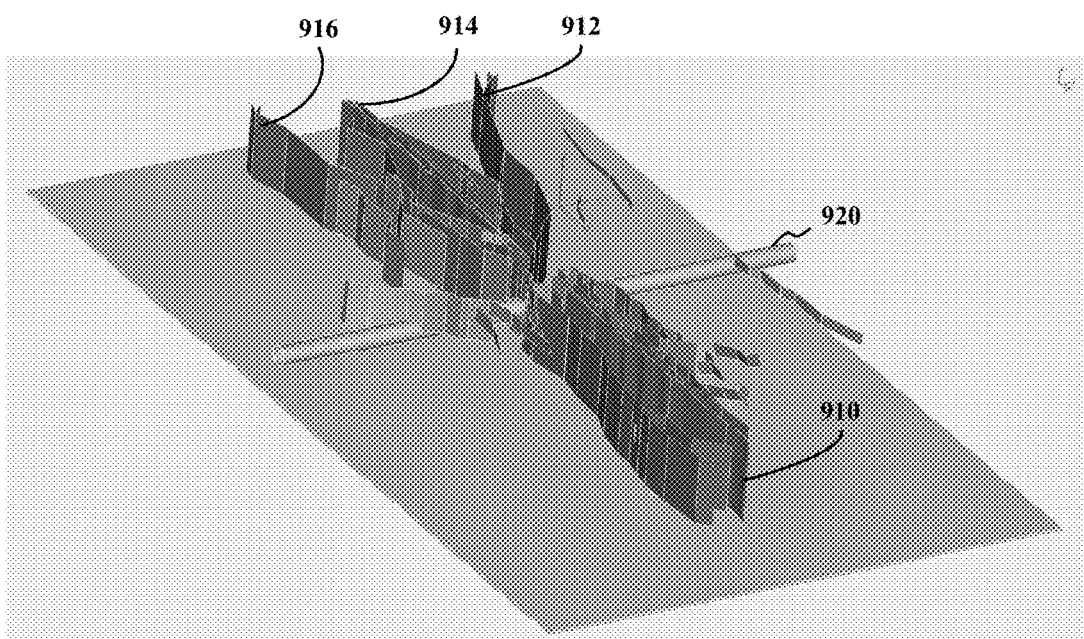
FIG. 9 is a diagram of a sample image derived from a radar survey of a proppant filled fracture zone.

Referring now to FIG. 9, an exemplary image 910 derived from observations relating to the methods and systems described in this invention is shown. The proppant filled fracture planes 912, 914 and 916 are rendered relative to the casing string 920, and provide the well operator with a visual reference for the fracture networks formed. The image is presented in a three dimensional format which can be rotated. The field of interrogation is limited by the range characteristics of the radar and the proximity of the interrogating antenna array to the perforation zone and resulting fracture filed.

Beam shaping and scanning, as well as interpretation of the reflected signals will now be discussed in greater detail. A dipole used as an antenna element on the exterior of a metal well casing has a more complex behavior than its free-space analog. At short separation distances from the surface, the metal casing behaves as a convex-shaped reflector and concentrates the energy that would have otherwise been projected into the omnidirectional pattern. This results in a radiation pattern that is directionally-dependent.

Computational electromagnetic (CEM) simulations were performed utilizing the Method of Moments (MoM) technique over the preferred frequency range for the system utilizing the wire-based grid of FIG. 3B. A representative selection of the results have been rendered graphically and displayed in FIGS. 10, 13, 14 and 15. It will be appreciated that there are other CEM techniques of equal validity—the alternate choice of which does not convey limitation to the present invention in any fashion.

Figure 10A:
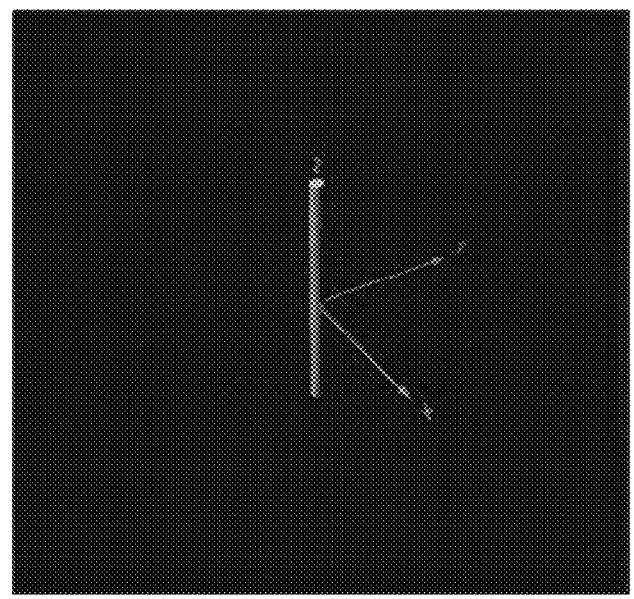
FIGS. 10A and 10B show the results of a dipole placed on the exterior of a metal casing.
Figure 10A:
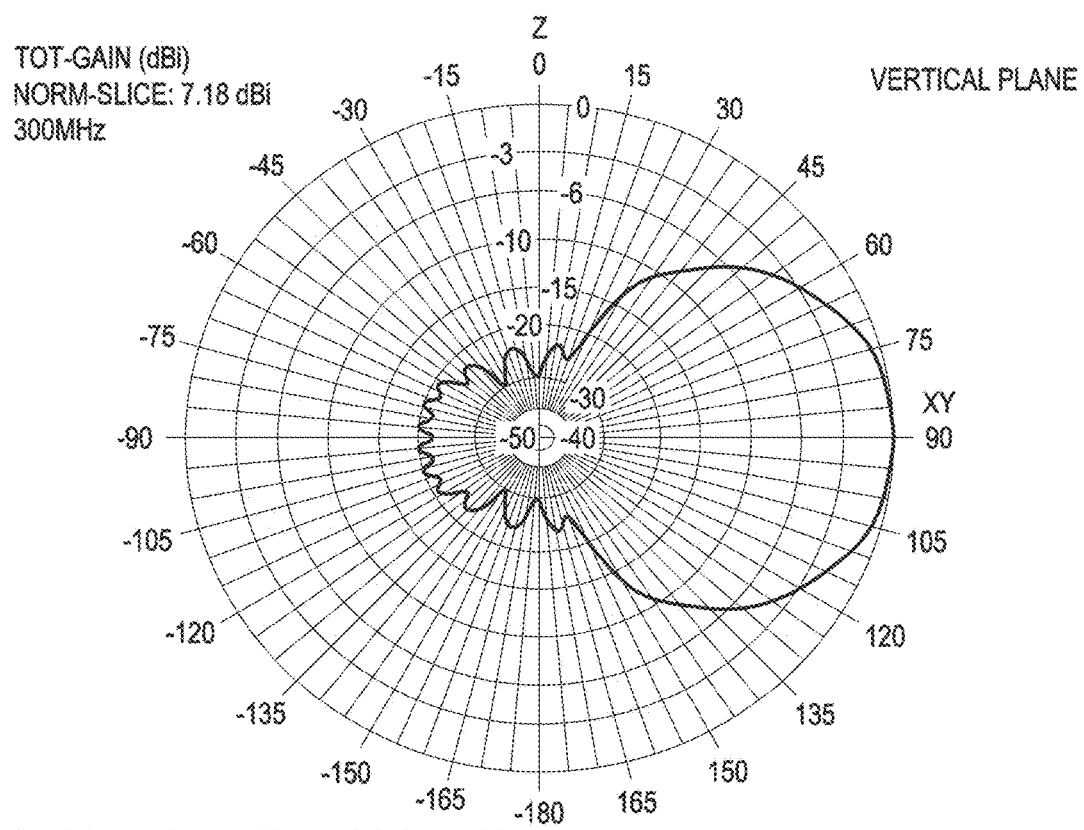
Figure 10B:
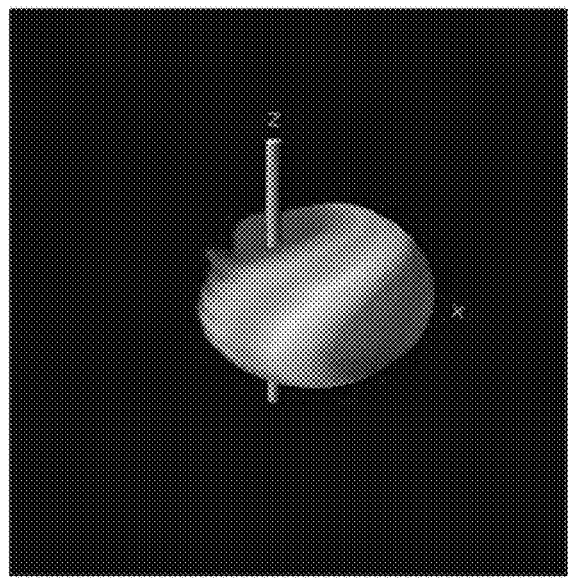
Figure 10B:
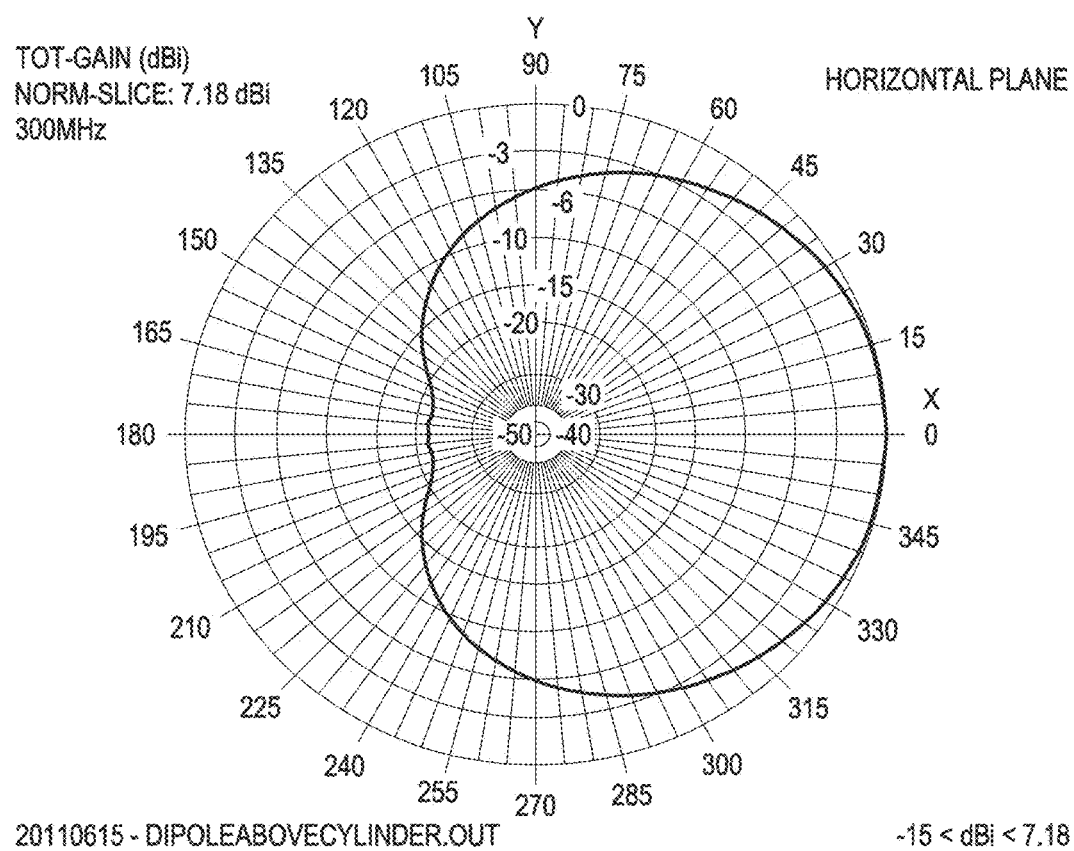

FIGS. 10A and 10B show the results of a dipole placed on the exterior of the well. The result is a directional pattern with a maximum gain of 7.18 dB and a horizontal 3 dB beamwidth $\theta_{3\ dBH}$) of ~130° The improvement from a maximum gain of 2.01 dB to a gain of 7.18.

Figure 11:
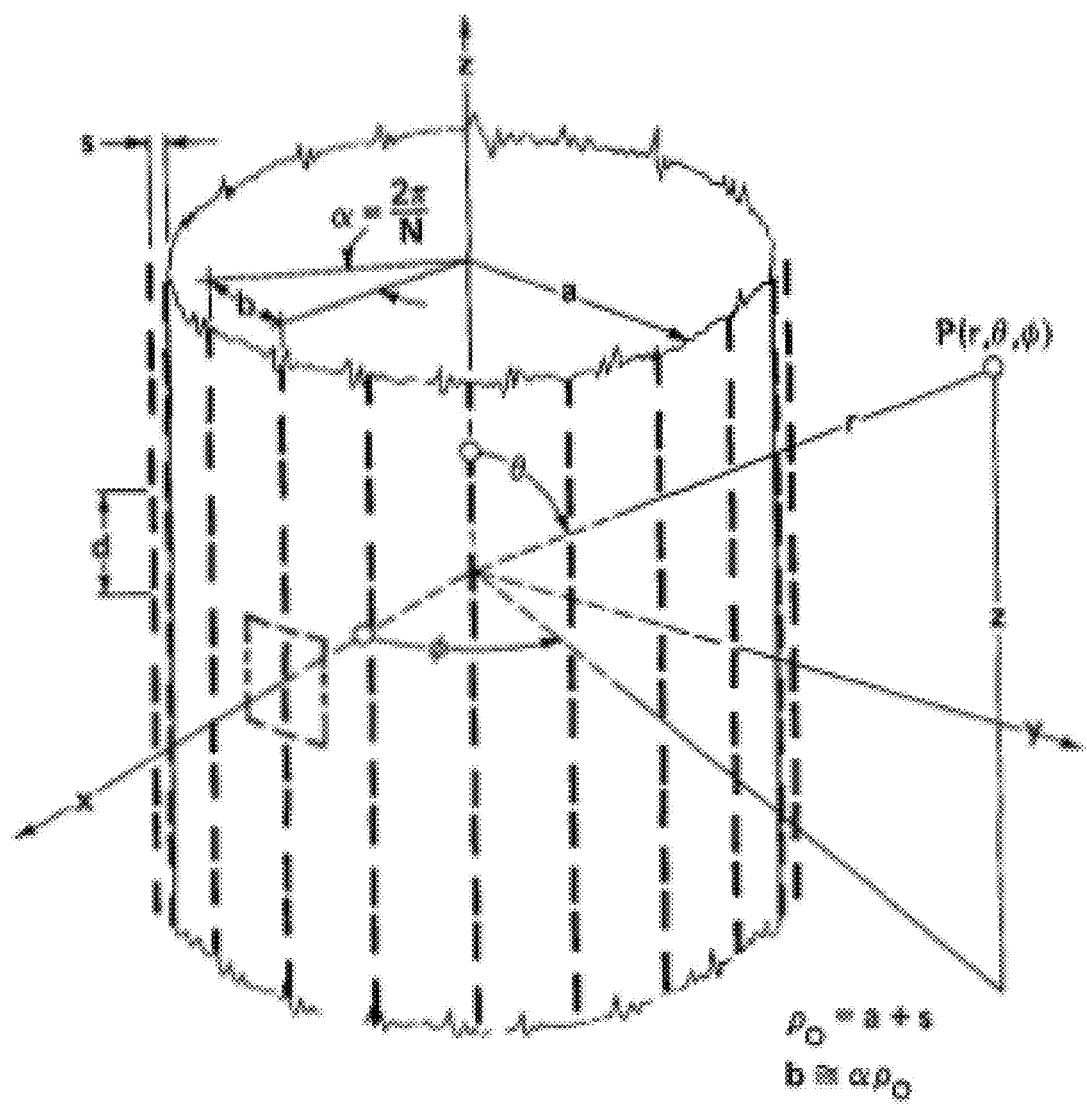
FIG. 11 shows a rectangular lattice of dipole antenna elements on a cylindrical array design.

FIG. 11 shows a rectangular lattice based cylindrical array of dipole antenna elements—appropriate to a wellbore casing. A rectangular lattice is a simple rectangular arrangement of the antenna elements on the topological surface.

In an alternative embodiment, the arrays are formed on a flexible high temperature substrate, such as Kapton, and then the flexible substrate is attached in a conformal fashion onto the outside of the casing section of interest.

The following examples describe a 3×8 array to investigate the behavior of the sub-array units.

Figure 12:
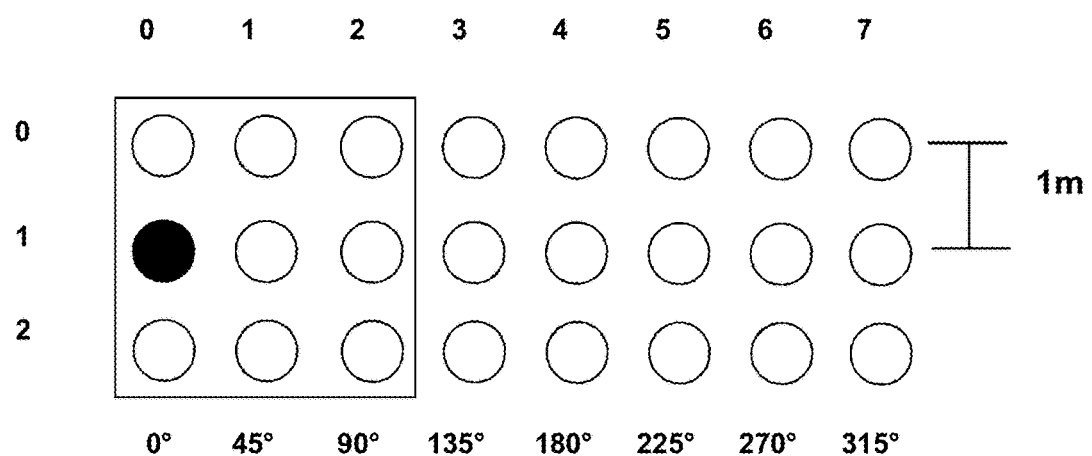
FIG. 12 shows an Array Layout and Excitation (ALE) Diagram. The array elements are numbered according to the top labeling. This diagram shows element (0,1) located on Ring 1 at $\Phi=0°$ as an active signaling element (black dot). The rest of the elements are inactive (white dot). The square displays a 3×3 sub-array from an 8×3 full array.
Figure 13A:
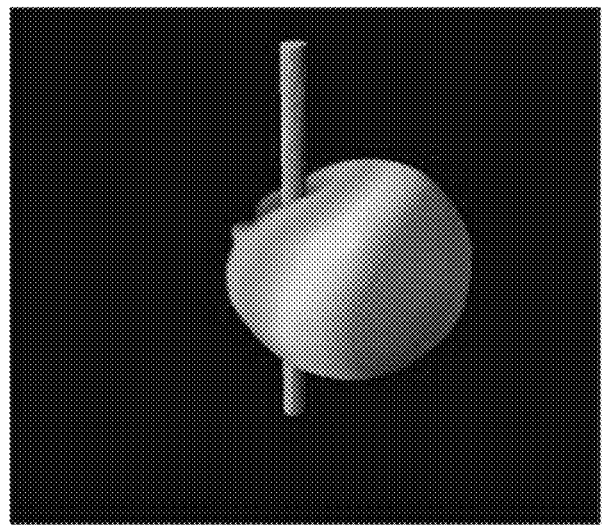
FIGS. 13A and 13B show a horizontal activation architecture diagram. The following items are shown: ALE Diagram [FIG. 13B Top]; total radiation pattern [FIG. 13A Top]; horizontal radiation pattern [FIG. 13B Bottom]; and vertical radiation pattern [FIG. 13A Bottom].
Figure 13A:
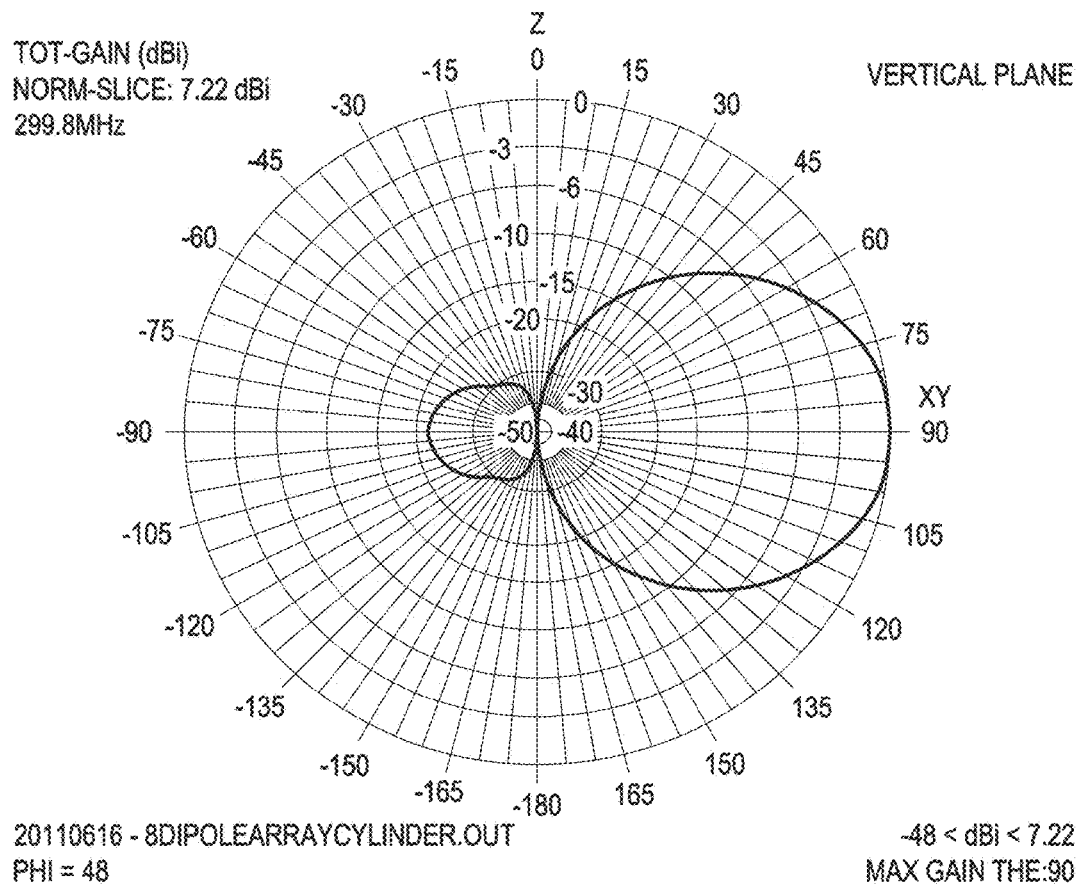
Figure 13B:
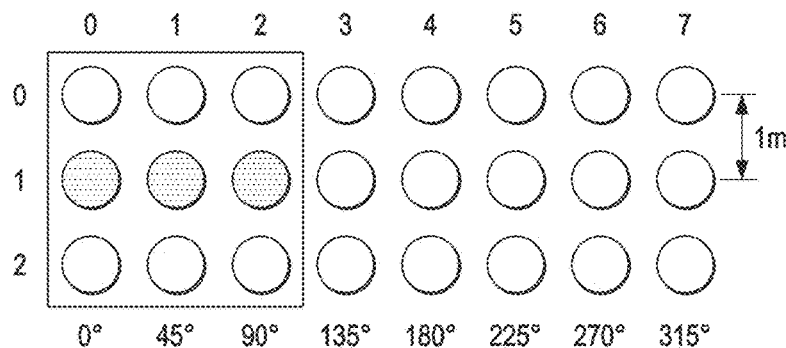
Figure 13B:
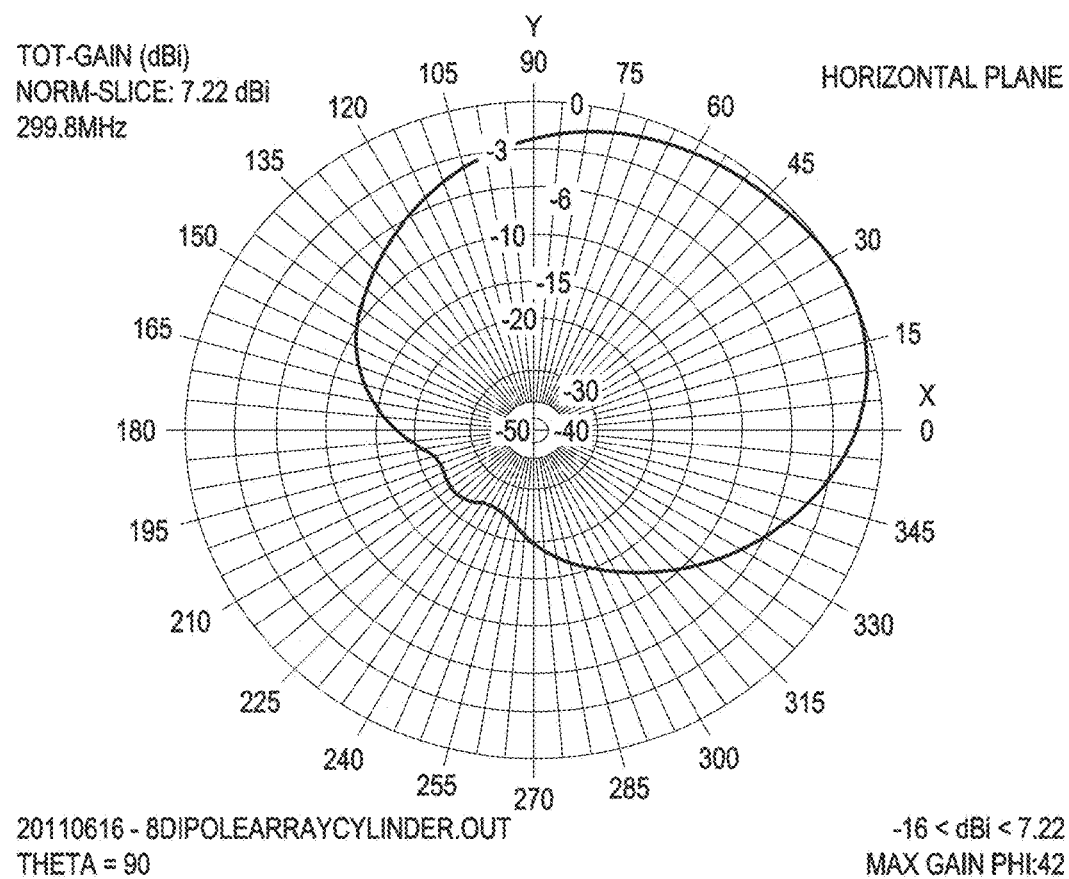
Figure 14A:
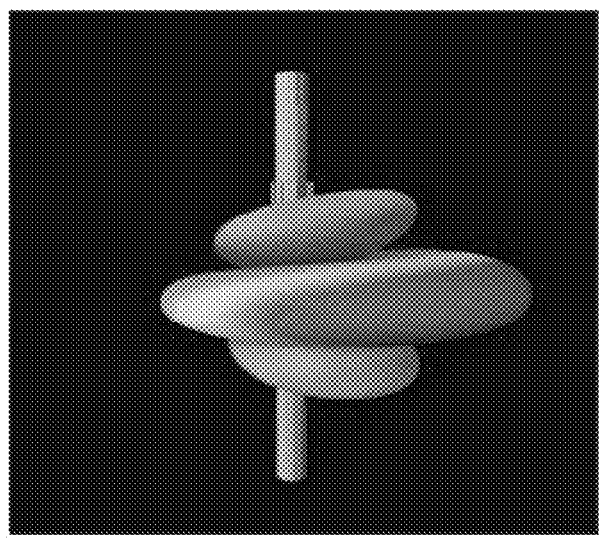
FIGS. 14A and 14B show a vertical activation architecture diagram. The following items are shown: ALE Diagram [FIG. 14B Top]; total radiation pattern [FIG. 14A Top]; horizontal radiation pattern [FIG. 15B Bottom]; and vertical radiation pattern [FIG. 15A Bottom].
Figure 14A:
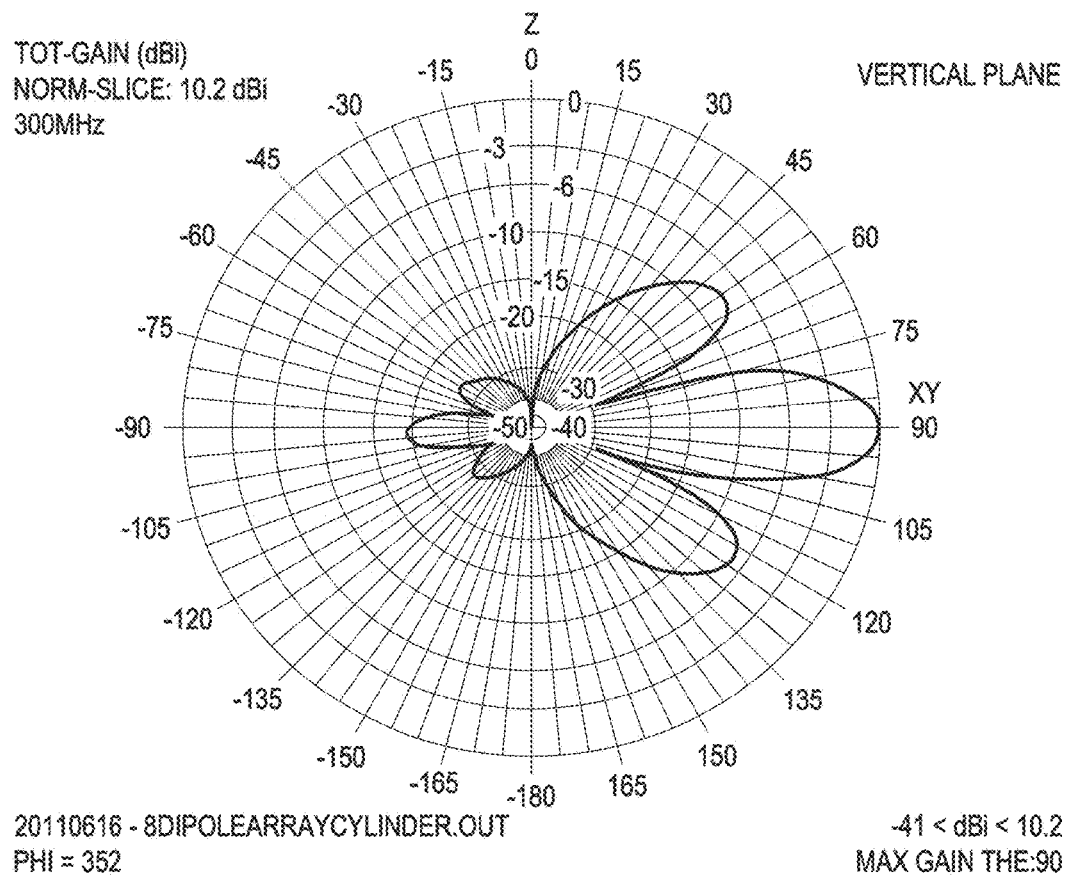
Figure 14B:
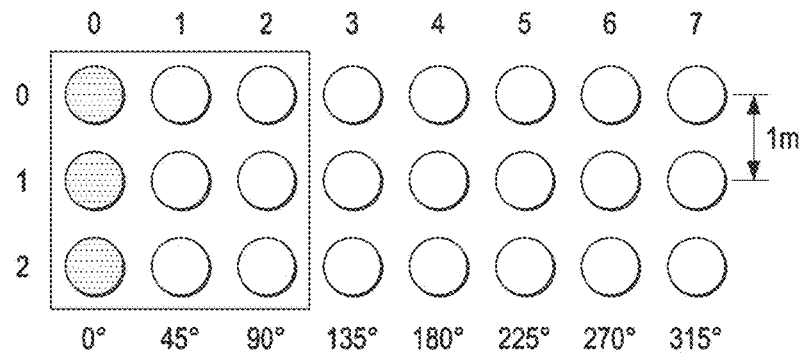
Figure 14B:
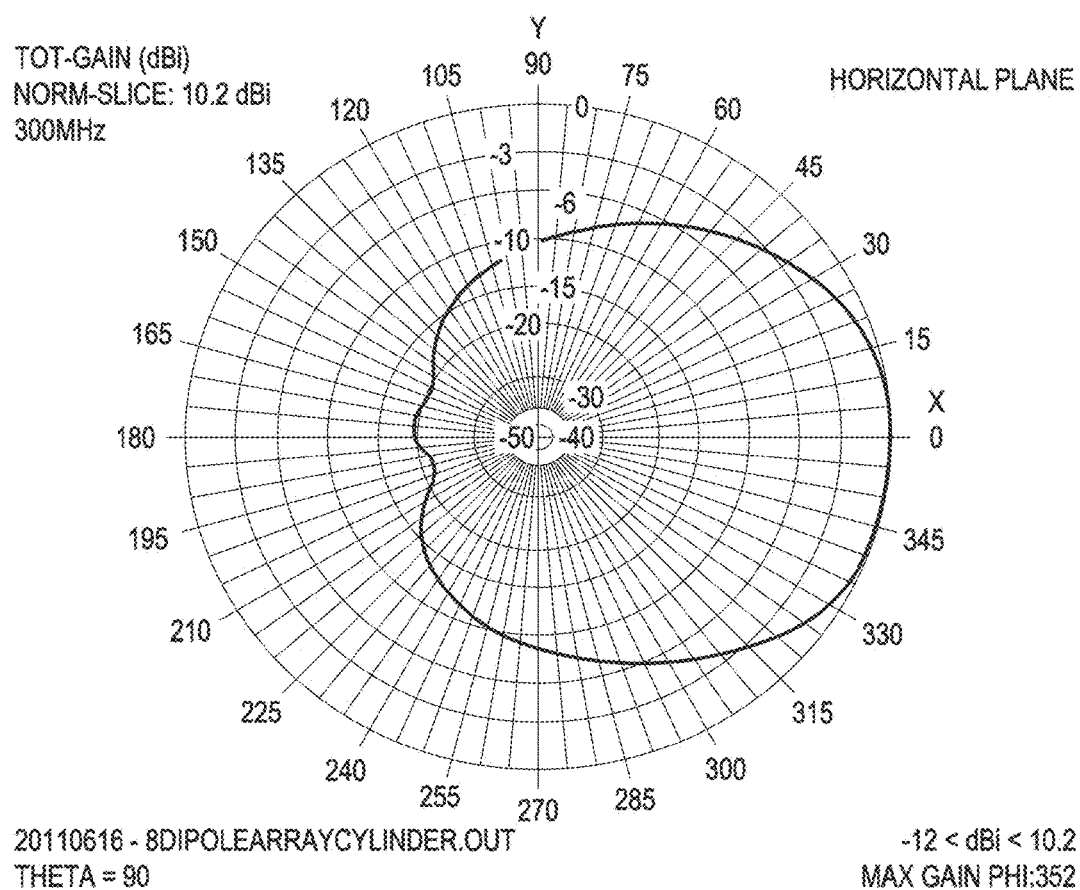

FIG. 12 is an Array Layout and Excitation (ALE) Diagram. This diagram shows the ring and column placement as a function of azimuth angle. Each antenna element in the array is assigned a unique number corresponding to the row and column numbering. White circles indicate inactive elements in the array while black filled circles indicate excited elements in the array. The square indicates the active 3×3 sub-array of elements. Three activation architectures are described for 3×3 sub-array clusters that result in different cancellation effects for the cumulative radiation pattern. These are: horizontal activation architecture, vertical activation architecture and diagonal activation architecture.

The characteristics of maximum gain, direction of maximum gain, horizontal 3 dB beamwidth, and vertical 3 dB beamwidth were calculated during the simulation process. These quantities are useful for the classification of the patterns and discussion of their application to borehole radar.

All of the array elements were excited with equal amplitude, equal phase signals. This allows an example of the fundamental phase interaction of the architecture prior to phase differences in the excitation signals.

Horizontal activation architecture is the first fundamental style of activation architecture. A horizontal arrangement of three antennas is selected from the same ring and activated in concert.

FIGS. 13 A and 13B show the architecture diagram.
Maximum Gain $$G_{max} \approx 7.22 \text{ dB@}(90°, 47°) \tag{1}$$

3 dB Beamwidths $$BW_{74} = \theta_{3\ dBV} \approx 60° \tag{2a}$$

$$BW_0 = \theta_{3\ dBV} \approx 98° \tag{2b}$$

Radiation Pattern

The fundamental radiation pattern in this architecture occurs at the edges of the radiation pattern. The phases destructively cancel in the azimuthal direction near the edges of the pattern—narrowing the horizontal beamwidth from 130° [for an individual dipole] to 98° [for the array]. The vertical beamwidth is left intact.

Vertical activation architecture is the second fundamental style of activation architecture. A vertical arrangement of three antennas is selected from the adjacent rings at the same azimuth angle and activated in concert.

FIGS. 14 A and 14B show the architecture diagram.

Maximum Gain $$G_{max} \approx 10.2 \text{ dB@}(90°, 352°) \tag{3}$$

3 dB Beamwidths $$BW_\theta = \theta_{3\ dBV} \approx 22° \tag{4a}$$

$$BW_\theta = \theta_{3\ dBV} \approx 105° \tag{4b}$$

Radiation Pattern

The fundamental phase interaction in this architecture occurs in flat circular rings of destructive and constructive interference around the middle of the radiation pattern. The spacing between the elements in this sub-array is equivalent to a free-space separation distance of 1-wavelength ($\lambda_0$) as a result we see significant cancellation approximately ½ way between elements at the ½ wavelength ($\lambda_0/2$) line and constructive interference at the 1 wavelength line. These lines remain constant around the perimeter of the metal casing—the rings maintain their horizontal orientation and the effects witnessed at maximum amplitude.

The vertical pattern has become significantly concentrated in the center—increasing from 7.18 dB for our base-case of a single dipole to 10.22 dB for this sub-array.

One result of this simulation is the narrowing of the horizontal beamwidth from 130° for our base-case to 105° for this sub-array.

Diagonal activation architecture is another style of activation architecture. A diagonal arrangement of three antennas is selected from the adjacent rings at a progressively increasing azimuth angle and activated in concert.

Figure 15A:
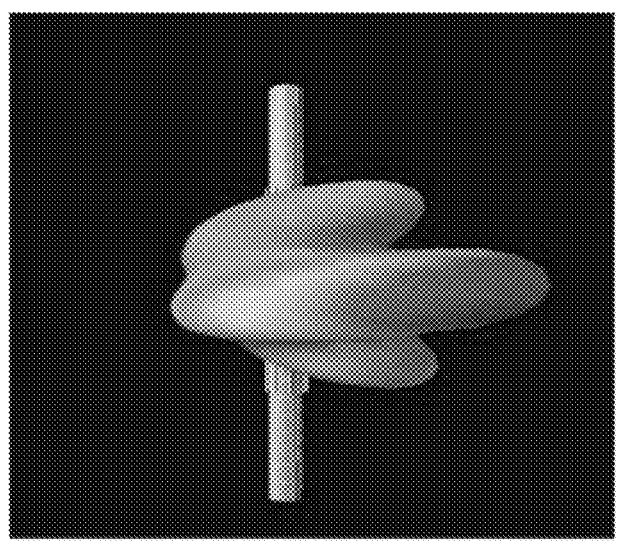
FIGS. 15A and 15B show a diagonal activation architecture diagram. The following items are shown: ALE Diagram [FIG. 15B Top]; total radiation pattern [FIG. 15A Top]; horizontal radiation pattern [FIG. 15B Bottom]; and vertical radiation pattern [FIG. 15A Bottom].
Figure 15A:
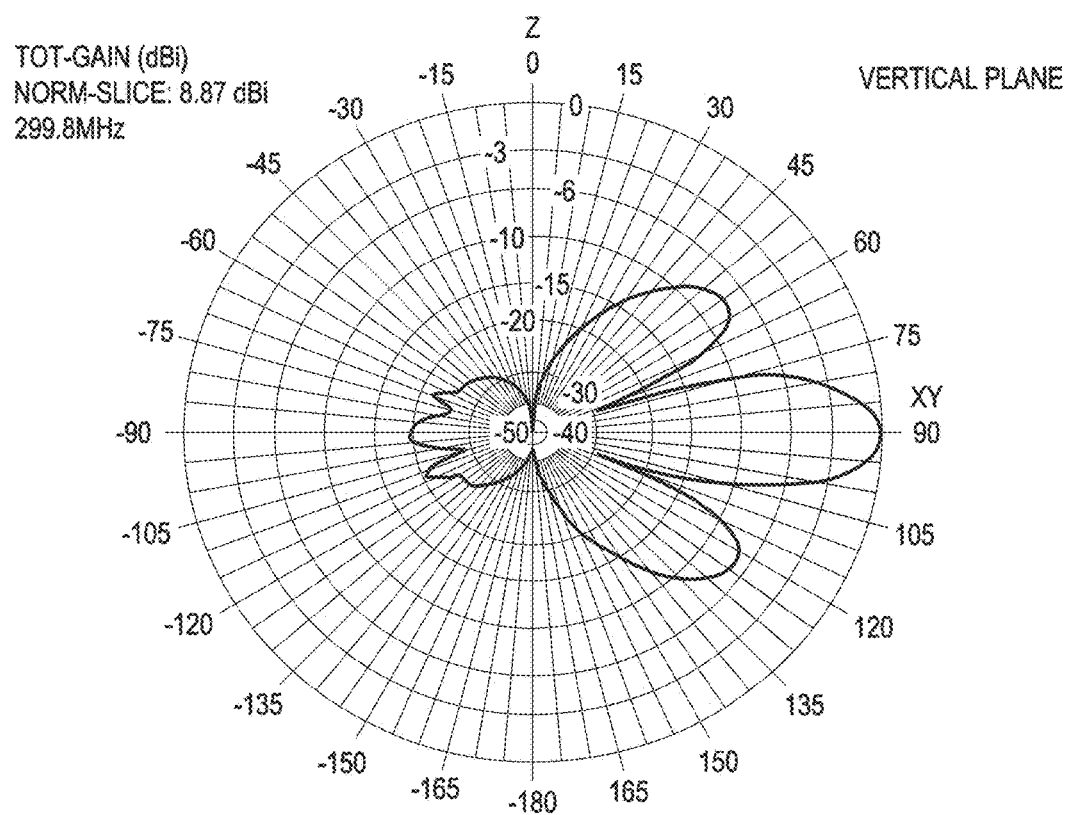
Figure 15B:
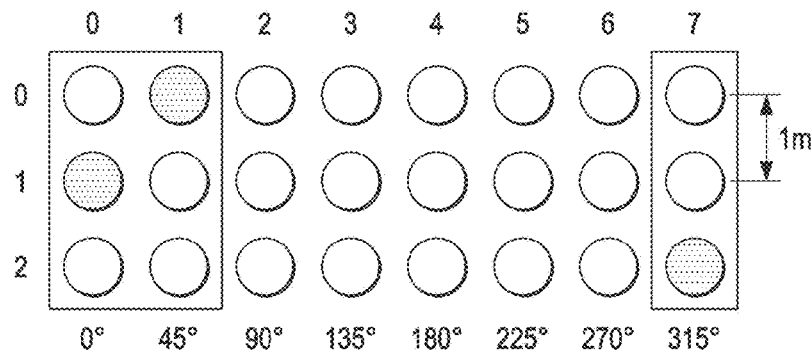
Figure 15B:
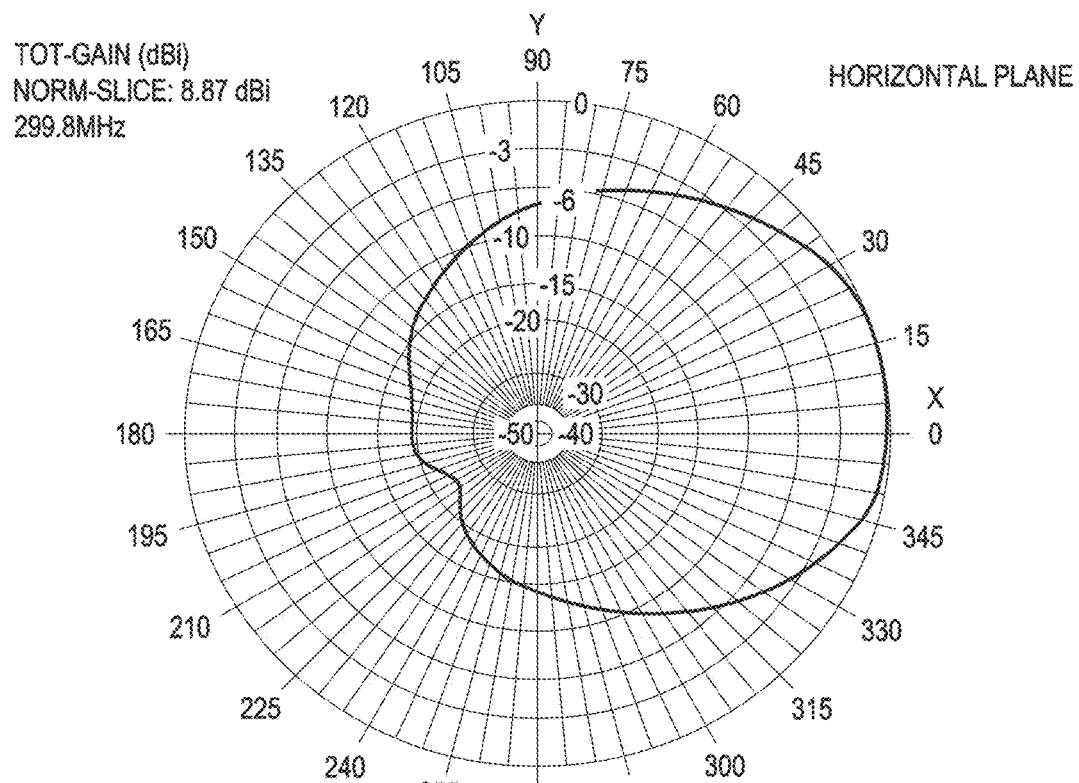

FIGS. 15A and 15B show the architecture diagram.
Maximum Gain $$G_{max} \approx 8.87 \text{ dB@}(90°, 15°) \tag{5}$$

Beamwidth $$BW_\theta = \theta_{3\ dBV} \approx 20° \tag{6a}$$

$$BW_\theta = \theta_{3\ dBV} \approx 102° \tag{6b}$$

Phase Interaction

The fundamental phase interaction in this architecture occurs in sloping circular rings around the middle of the radiation pattern. The rings of constructive and destructive interference occur at 1 wavelength ($\lambda_0$) and ½ wavelength ($\lambda_0 2$), respectively. The base separation between rings is 1 wavelength, so the separation between elements is slightly longer by the angular separation from the azimuth offset. This causes an incomplete interaction of the phases of the elements.

The resulting maximum gain was calculated to be 8.87 dB with the direction of the maximum offset from the center of the array. The vertical beamwidth is slightly narrower than the vertical architecture at 20°. vs. 22°—while the horizontal beamwidth is slightly narrower as well at 102° vs. 105°.

In practice, the topology of the major lobe makes this pattern useful. In the field, there is likely to be data ambiguity in the waveform generated by the illumination footprint for some orientations of the fracture relative to the wellbore. Keeping the center of the beam pointed in the direction of the ambiguity and activating two opposing diagonal patterns will illuminate different areas of the same region.

Figure 16:
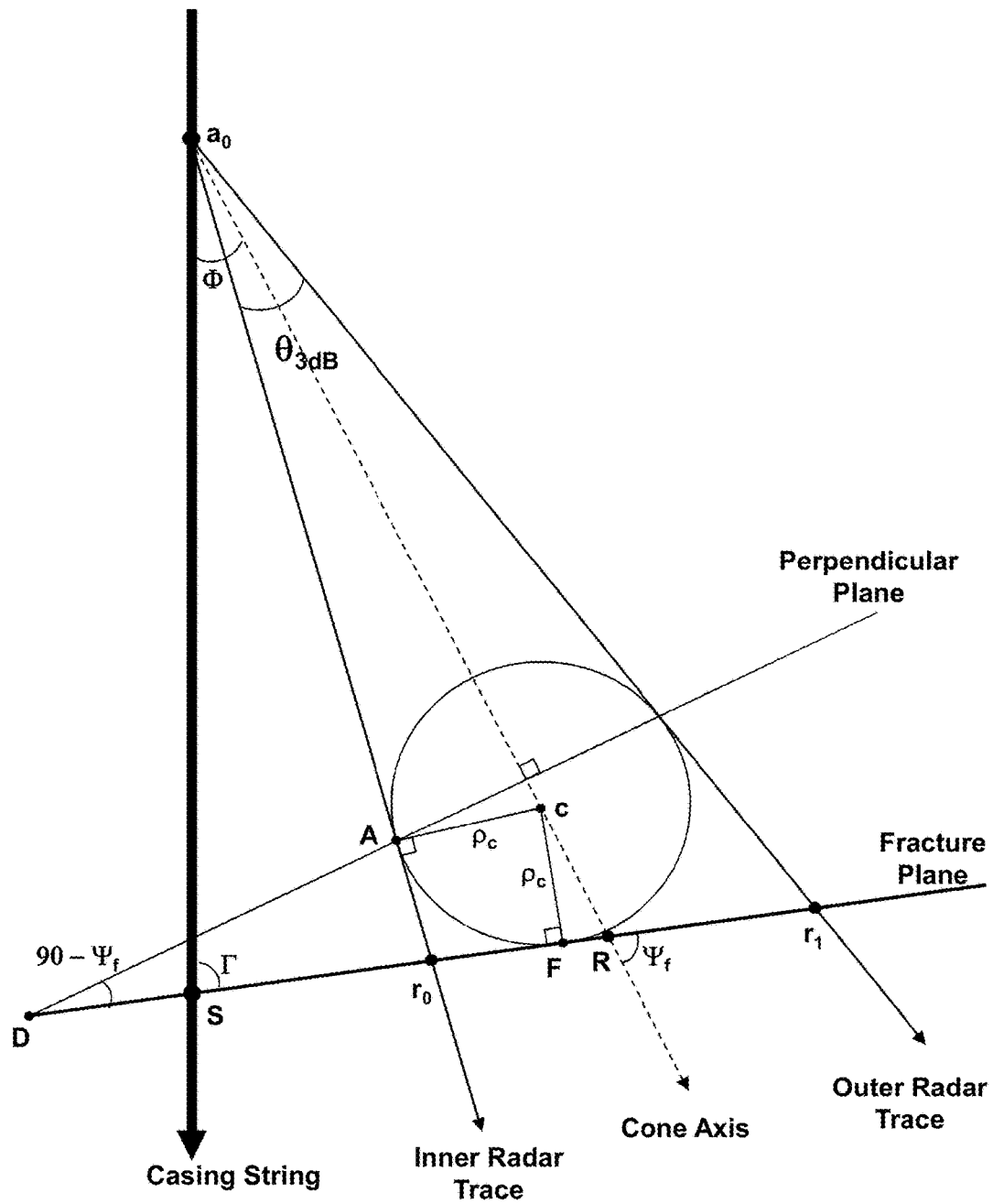
FIG. 16 shows a two dimensional slice through a Dandelin Conic Construction.

The basic geometric optics for extracting information about a reflecting plane from the EM reflection can be physically described using a simplified model of a plane intersecting a conic. The cone formed by the 3 dB beamwidth of the array radiation pattern can be approximated with a conic construction. The geometric relations are defined by standard conic section geometry and can be understood by reference to the Dandelin construction of conic sections. FIG. 16 shows the relevant 2D geometry.

This model provides a reasonable approximation of the way in which a radar beam, defined by its 3 dB beamwidth, may be used to locate and map a transverse fracture plane originating from a metallic casing string, and provides a simple geometric basis to analyze the reflected waveform to determine the orientation and position of the reflective surface. It will be appreciated that more sophisticated models may be developed. Such models will be apparent to one of ordinary skill in the art.

In the range of angular orientations of the fracture against the wellbore, the intersection of a cone-shaped beam with a plane results in an elliptical illumination footprint. The spatial location and eccentricity of the ellipse formed on the fracture plane is determined. The key quantities of interest are the beam contact angle that the radar beam forms with the fracture plane, $\Psi_f$, the strike angle which the fracture plane forms with the metallic casing string, $\Gamma$, the strike location where the fracture plane intersects the metallic casing string, $a_0 S$, and the radar range to the illumination surface, $a_0 R$. Resulting relationships from the model are shown below.

The Beam-Fracture Strike Angle $$\Psi_f = \cos^{-1}\left(\cos\left(\frac{\theta_{3dB}}{2}\right)\sqrt{1-\left(\frac{b}{a}\right)^2}\right) \quad (7)$$

The Casing-Fracture Strike Angle $$\Gamma = \pi - (\Psi_f + \Phi) \quad (8)$$

Distance to Fracture Along Casing $$a_0 S = \Delta r_1 \left(\cos\left(\Phi - \left(\frac{\theta_{3dB}}{2}\right)\right) + \cot\Gamma \sin\left(\Phi + \left(\frac{\theta_{3dB}}{2}\right)\right)\right). \quad (9)$$

Distance from Array to the Footprint $$a_0 R = a_0 S\left(\frac{\sin\Gamma}{\sin\Psi_f}\right) \quad (10)$$

Several physically significant concepts are extendible to the observation of fractures. For example, real fractures are not expected to have perfectly planar habits. However, equations 5 and 6 are still useful for locating the orientation of the illuminated segment in space, even if the actual topology of the fracture plane is more complex.

The geometric relations shown in this section assume a monostatic array deployment, as shown in FIG. 8. With a monostatic deployment, signals are transmitted to the reflecting plane, and subsequently returned along the same vector paths to the same antenna array. During an actual measurement, the EM wave travels from the antenna to the reflection point (corresponding to one spatial vector), and after reflection travels an equivalent distance back to the receiving antenna. Key relations are shown above for the spatial vectors. The application of these relations to an actual signal must recognize that the vector path is a two-way path. Thus, time space conversions using measurements require an accounting for the two-way path transit:

$$\Delta r = \frac{\Delta t \cdot v}{2} \quad (11)$$

Where $\Delta r$ is the length from the center of the array to the position of a refection event in the formation, $\Delta t$ is the time from 0 to the reflection event (whether directly measured or acquired through inverse Fourier-Transform of frequency data), and v is the velocity of the EM wave in the formation.

There are several alternative methods of constructing a fracture surface map in space. One of the simplest is the construction of representative planes from time data—assuming an elliptical illumination model. The data requirements for constructing a representative plane map of a fracture surface in space are simpler than the previous construction. Only one time-point is assumed and the precise geometry of the illumination footprint is not required.

Figure 17:
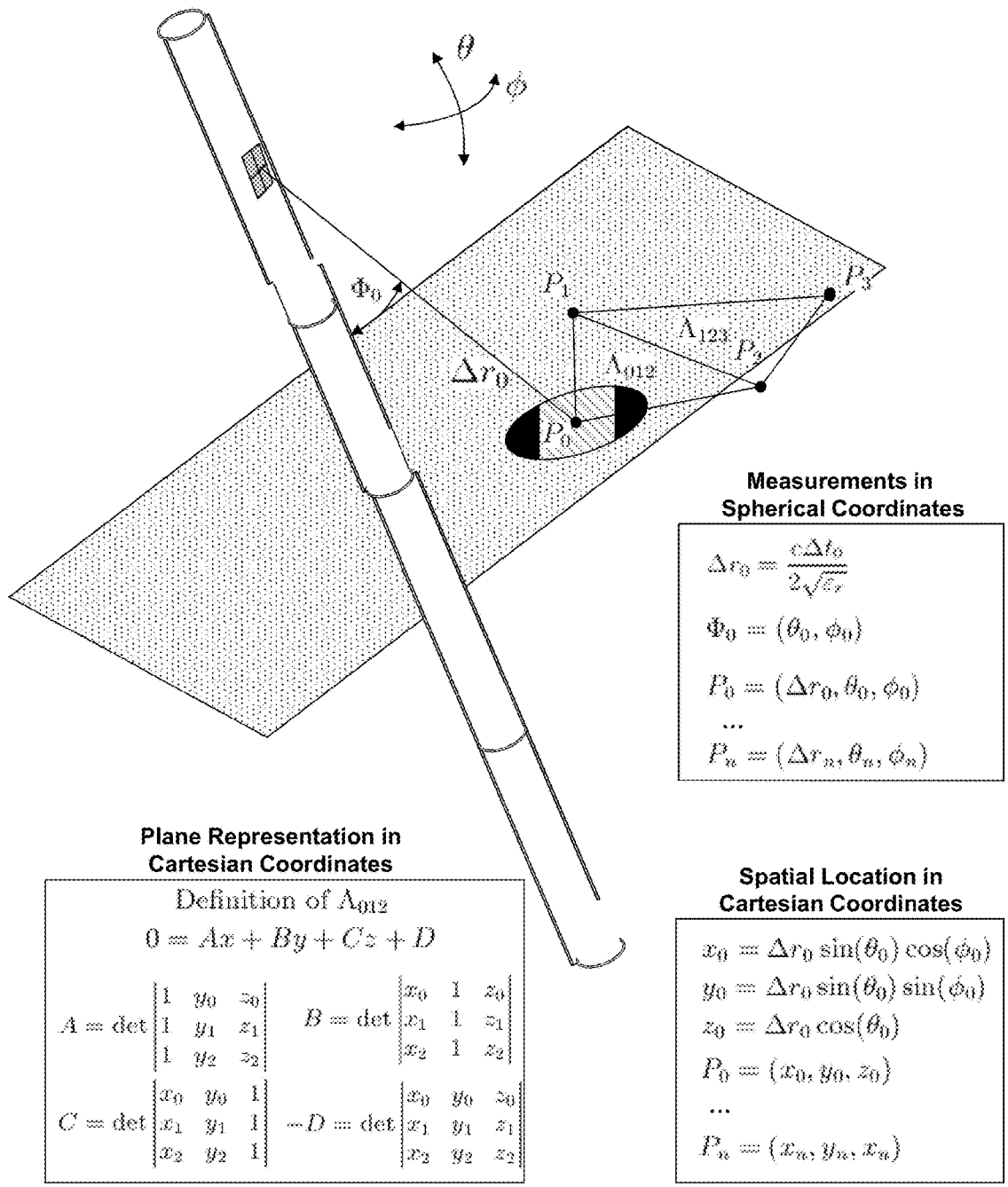
FIG. 17 shows a diagram of Fracture Mapping with Plane Image Generation.

FIG. 17 shows a diagram of fracture mapping with representative plane generation using the nomenclature discussed in this section.

The mathematical basis of representative plane generation is that three non-collinear points uniquely define the plane (A) which contains all those points. Thus, a plane can be defined for every collection of three points which orients the triangular area in space. Algorithmically, one plane is calculated for every sequential collection of three points and adjacent planes are joined along the edges to produce a triangular mesh of the fracture surface. This procedure will produce a representative mesh with three data points per surface area slice.

EXAMPLE

Given four spatial points $P_0=(x_0, y_0, z_0)$, $P_1=(x_1, y_1, z_1)$, $P_2=(x_2, y_2, z_2)$ and $P_3=(x_3, y_3, z_3)$, two triangular regions are defined that are situated in two unique planes. The first plane ($\Lambda_{012}$) is defined by points $P_0$, $P_1$ and $P_2$ while the second plane ($\Lambda_{123}$) is defined by points $P_1$, $P_2$ and $P_3$.

Assume that the medium is a lossless dielectric medium ($\mu_r=1$, $\sigma=0$[relative magnetic permeability, conductivity]) and time-point $t_0$ is measured and assume that the beam steering angle ($\Phi_0$) and the 3 dB beamwidths ($\theta_{3\,dBV}$ & $\theta_{3\,dBH}$) are known. The distance from the center of the array to the reflection point is given by equation:

$$\Delta r_0 = \frac{c\Delta t_0}{2\sqrt{\varepsilon_r}} \quad (12)$$

In the direction of the beam steering angle ($\Phi_0$) which defines the azimuth and elevation of the pointed beam:

$$\Phi_0=(\theta_a, \emptyset_0) \quad (13)$$

Measurements are taken in the spherical coordinate system, so spatial location of the reflection point in spherical coordinates is defined as:

$$P_0=(\Delta \cdot r_0, \theta_0, \emptyset_0) \quad (14)$$

The location of this reflection point is converted to absolute spatial coordinates (Cartesian) through the substitution of variables:

$$x_0=\Delta r_0 \sin(\theta_0)\cos(\emptyset_0)$$

$$y_0=\Delta r_0 \sin(\theta_0)\cos(\emptyset_0)$$

$$z_0=\Delta r_0 \cos(\emptyset_0) \quad (15)$$

The resulting reflection point is now located in absolute spatial coordinates (Cartesian) and is denoted as:

$$P_0 = (x_0, y_0, z_0) \tag{16}$$

This process is then repeated to acquire two additional non-collinear points $P_1$ and $P_2$. Under the assumption that points $P_0$, $P_1$ and $P_2$ all lie in the same plane (which we denote $A_{012}$), we solve the general equation for a plane in space by forcing the plane to contain the three points uniquely. This produces a set of parameters A, B, C and D which locate and orient the plane in space.

The general equation for a plane in Cartesian coordinate space is:

$$0 = Ax + By + Cz + D \tag{17}$$

The plane-parameters are then specified by assuming that A, B, C and D contain each of $P_0$, $P_1$ and $P_2$, and solving the resulting simultaneous linear equations:

$$A = \det \begin{vmatrix} 1 & y_0 & z_0 \\ 1 & y_1 & z_1 \\ 1 & y_2 & z_2 \end{vmatrix} \quad B = \det \begin{vmatrix} x_0 & 1 & z_0 \\ x_1 & 1 & z_1 \\ x_2 & 1 & z_2 \end{vmatrix} \tag{18}$$

$$C = \det \begin{vmatrix} x_0 & y_0 & 1 \\ x_1 & y_1 & 1 \\ x_2 & y_2 & 1 \end{vmatrix} \quad -D = \det \begin{vmatrix} x_0 & y_0 & z_0 \\ x_1 & y_1 & z_1 \\ x_2 & y_2 & z_2 \end{vmatrix}$$

The plane $\Lambda_{012}$ is now uniquely defined and has the surface normal vector:

$$n_{012} = |P_1 - P_0| \times |P_2 - P_0| \tag{19}$$

This process is repeated for every sequential collection of three points (e.g. $\Lambda_{12}$, $\Lambda_{123}$, $\Lambda_{234}$, etc. ...) within the same survey to define a mesh of the representative planes that are applicable for the triangular area.

This system provides a technical basis for the construction of a borehole radar system to analyze the fracture networks formed during hydraulic fracturing as well as the creation of reliable maps of those fields from the received data. The radar system design is based upon state-of-the-art phased-array design, placement on a metal cylinder and operation in lossy geologic environments. This phased-array is used to synthesize a beam that can be scanned through a variety of azimuth and elevation angles surrounding the wellbore to achieve full coverage of the formation.

Unique features of the above described systems and methods include:
  an operation using radar to scan a hydraulically fractured region, to analyze the reflected signals, and to form a map of the fracture network;
    a borehole radar architecture that uses antenna arrays to project shaped electromagnetic beams capable of being scanned 360° around the casing; and
    a simplified analysis of the beam footprint optics to map the fracture surface.

The foregoing description and embodiments are intended to illustrate the invention without limiting it thereby. It will be obvious to those of ordinary skill in the art that the invention described herein can be essentially duplicated by making minor changes in the material content, the method of manufacture, or geometric architecture. To the extent that such material, methods, or designs are substantially equivalent, it is intended that they be encompassed by the following claims.

What is claimed is:

1. A system for mapping structural features, including fracture features, in the fluid space of a geologic formation proximate to a cased borehole, comprising:
  proppant disposed in the fluid space of the geologic formation, wherein at least part of the proppant is treated to increase electromagnetic reflectivity at an operating frequency of electromagnetic signals generated by at least one antenna array;
  at least one movable antenna array that comprises a rotary dish antenna associated with a wellbore casing and extending beyond the wellbore casing, the at least one movable antenna array having an unobstructed electromagnetic view of the geologic formation based on the location of the proppant disposed within the geologic formation the at least one movable antenna array comprising two or more antennas, wherein at least two of the two or more antennas are interconnected so they can operate in sequence;
  a downhole tool comprising an array control module in communication with the at least one antenna array;
  a surface control unit coupled to the downhole tool and in communication with the at least one movable antenna array, the surface control configured to actuate the at least one movable antenna array to generate sequenced electromagnetic signals at the operating frequency and through a plurality of interrogation angles; and
  the at least one movable antenna array configured to receive reflected electromagnetic signals from the proppant in the fluid space of the geologic formation from the at least one antenna array for each of the plurality of interrogation angles; the surface control unit configured to analyze the received electromagnetic signals and generate an image displaying at least one attribute of the fluid space of the geologic formation.

2. The system of claim 1 wherein the actuation signal creates a scanned electromagnetic beam.

3. The system of claim 1, wherein all of the proppant is treated to increase electromagnetic reflectivity at the operating frequency.

4. The system of claim 1 wherein the actuation signal generates a plurality of scanned electromagnetic signals.

5. The system of claim 1, wherein the transmitted signals are sequenced to control the direction of transmission into the geologic formation.

6. The system of claim 1 wherein the same antenna generates the electromagnetic signals and receives the reflected electromagnetic signals.

7. The system of claim 1 wherein the at least one antenna array is a phased array.

8. The system of claim 1 wherein the electromagnetic signals are generated at a frequency of 30 kHz to 10 GHz, or 10 kHz to 30 GHz, or 300 kHz to 3 GHz.

9. The system of claim 1 wherein the at least one antenna array comprises rings of half-wave dipole antennas.

10. The system of claim 1 wherein the at least one antenna array is positioned on the outside of the wellbore casing.

11. A method for mapping structural features, including fracture features, in the fluid space of a geologic formation proximate to a cased borehole, the method comprising the following steps:
  deploying proppant into the fluid space of the geologic formation, wherein at least part of the proppant is treated to increase electromagnetic reflectivity at an operating frequency of electromagnetic signals;
  deploying at least one movable antenna array that comprises a rotary dish antenna proximate to wellbore casing and that extends beyond the wellbore casing, the at least one movable antenna array having an unobstructed electromagnetic view of the geologic formation the at least one movable antenna array comprising two or more antennas, wherein at least two of the two or more antennas are interconnected so they can operate in sequence;

generating electromagnetic signals at the operating frequency from the at least one movable antenna array through a plurality of interrogation angles and across at least a portion of the fluid space of the geologic formation;

receiving reflected electromagnetic signals reflected from at least a portion of the proppant in the fluid space of the geologic formation; and processing the reflected electromagnetic signals to generate an image of at least one feature of the fluid space of the geologic formation.

12. The method of claim 11 wherein the geologic formation includes the proppant disposed within at least one fracture and the image comprises at least a representation of the location of the fracture.

13. The method of claim 11 wherein the at least one antenna array transmits at least one frequency and the proppant is treated to increase reflectivity at the at least one frequency.

14. The method of claim 11 that further including the steps of (a) performing a first survey, comprising at least one scan through at least one region, (b) performing a fracturing operation to inject the proppant into at least one fracture within at least some of the at least one a portion of the geologic formation, and (c) then performing a second survey, comprising at least one scan through the at least one portion and comparing the results to determine at least one outcome of a fracturing operation.

15. The method of claim 11, wherein all of the proppant is treated to increase electromagnetic reflectivity.

16. The system of claim 11 that further includes the step of treating at least part of the proppant to increase its electromagnetic reflectivity at the operating frequency.

17. The method of claim 11 wherein the same antenna generates the one or more operating electromagnetic signals and receives the reflected electromagnetic signals.

18. The method of claim 11 wherein the at least one antenna array is a phased array.

19. The method of claim 11 wherein the one or more operating electromagnetic signals are generated at a frequency of 30 kHz to 10 GHz, or 10 kHz to 30 GHz, or 300 kHz to 3 GHz.

20. The method of claim 11 wherein the antenna array comprises rings of half-wave dipole antennas.

21. The method of claim 11 that further includes the step of positioning the at least one antenna array on the outside of the wellbore casing prior to the wellbore casing being installed in a borehole.

22. The method of claim 11, wherein the transmitted signals are sequenced to control the direction of transmission into the geologic formation.

* * * * *